(12) United States Patent
Yamada et al.

(10) Patent No.: US 8,158,218 B2
(45) Date of Patent: Apr. 17, 2012

(54) PROCESS FOR PRODUCING OPTICAL FILM, OPTICAL FILM, POLARIZER, AND LIQUID CRYSTAL DISPLAY

(75) Inventors: Rumiko Yamada, Tokyo (JP); Atsuko Matsuda, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/936,835

(22) PCT Filed: Apr. 24, 2009

(86) PCT No.: PCT/JP2009/058154
§ 371 (c)(1),
(2), (4) Date: Oct. 7, 2010

(87) PCT Pub. No.: WO2009/133815
PCT Pub. Date: Nov. 5, 2009

(65) Prior Publication Data
US 2011/0033640 A1    Feb. 10, 2011

(30) Foreign Application Priority Data

May 2, 2008  (JP) .................. 2008120251
Jun. 20, 2008  (JP) .................. 2008161517

(51) Int. Cl.
*C09K 19/00* (2006.01)
(52) U.S. Cl. ............ 428/1.1; 264/1.34; 264/173.1; 264/173.16; 264/237; 264/1.7; 264/464; 264/466; 264/471
(58) Field of Classification Search ............ 428/1.1; 264/1.34, 1.6, 1.7, 2.6, 464, 466, 471, 172.19, 264/173.1, 173.16, 211.12, 237, 348
See application file for complete search history.

(56) References Cited

U.S. PATENT DOCUMENTS

2006/0202366 A1 *   9/2006  Murakami et al. ............ 264/1.7
2008/0043176 A1 *   2/2008  Yamada et al. ................ 349/96
2009/0099308 A1 *   4/2009  Takebe et al. ............ 525/54.21

FOREIGN PATENT DOCUMENTS

| JP | 05119217 A | * | 5/1993 |
| JP | 1045804 | | 2/1998 |
| JP | 2001215331 | | 8/2001 |
| JP | 2007185882 | | 7/2007 |
| JP | 2007219110 | | 8/2007 |

OTHER PUBLICATIONS

Mechine translation of JP 2007219110 A.*

* cited by examiner

*Primary Examiner* — Angela Ortiz
*Assistant Examiner* — Ruiyun Zhang
(74) *Attorney, Agent, or Firm* — Lucas & Mercanti, LLP

(57) ABSTRACT

Provided is a method for producing an optical film which suffers neither flatness deterioration nor film breakage and is free from problems concerning undulating undulation and partial light leakage. The process for optical film production comprises laminating a cellulose ester resin layer (A) to an acrylic resin layer (B) by coextrusion. The process is characterized in that the cellulose ester resin layer (A) contains 55 to 99 mass % cellulose ester resin and the acrylic resin layer (B) contains 55 to 99 mass % acrylic resin, that the web is conveyed while keeping the layer (A) and the layer (B) in contact with the surface of a first cooling roll and the surface of a second cooling roll, respectively, and that when the surface temperature of the first cooling roll and the surface temperature of the second cooling roll are expressed by Ta (° C.) and Tb (° C.), respectively, then the Ta (° C.) and Tb (° C.) satisfy the following relationship (1).

$(Ta-80)°\ C. < Tb(°\ C.) < (Ta-5)°\ C.$    Relationship (1)

7 Claims, 4 Drawing Sheets

PROCESS FOR PRODUCING OPTICAL FILM, OPTICAL FILM, POLARIZER, AND LIQUID CRYSTAL DISPLAY

This Application is a 371 of PCT/JP2009/058154 filed Apr. 24, 2009 which in turn claims the priorities of Japanese Patent Application Nos. 2008-120251 filed May 2, 2008 and 2008-161517 filed Jun. 20, 2008, all three applications are incorporated by reference herein.

FIELD OF THE INVENTION

The invention relates to a method for producing an optical film, optical film, polarizing plate and liquid crystal display, more in detail, a method for producing an optical film free from partial light leakage and undulation.

BACKGROUND OF THE INVENTION

In a method for producing an optical film by a solution extrusion method, a method to produce a lamination type optical film employing an acrylic resin and a cellulose ester resin via co-extrusion is disclosed in Patent Document 1. Its object is to provide a protective film for a polarizing plate having low retardation, low optical distortion, minimized bright spot foreign matters, good dimensional stability at high humidity, minimized curling, an adhesion property to glass substrate or the like. However it has been found that deviation of distribution of acrylic resin and cellulose ester resin in a layer occurs, and undulation and partial light leakage occurs since a resin solution is spread on an endless belt in case of co-extrusion in a solution extrusion method. Further it is apt to generate deviation of distribution of the additives in each layer as well as to generate curling.

On the other side, unnecessary stress suffers to interface between laminated films when a resin with high cooling speed shrinks, since cooling speed after film forming are different from each other depending on the kinds of resins to laminate in a laminate film via co-extrusion in a melt extrusion method. Consequently, there are problems that curling or insufficient adhesion occurs in some places, or above described undulation or partial light leakage generates.

A lamination type polarizing plate protective film of an acrylic resin and a cellulose ester resin via the melt extrusion method is disclosed in Patent Document 2. This improves strength at high moisture and temperature condition by forming a film which is three-layer construction composed of a cellulose acetate butylate resin having high moisture vapor permeability is sandwiched by a resin having moisture vapor permeability (such as acrylic resin), via film forming method using no solvent. However this improves change against moisture, the problems above described undulation and partial light leakage are not dissolved since there are problems of flatness deterioration due to wrinkle generated in cooling or drying process caused by difference in expansion and shrinkage property due to temperature and moisture between acrylic resin and cellulose ester resin, and processing troubles in film producing time such as film break at stretching or slitter process.

PRIOR ART DOCUMENT

Patent Document

Patent Document 1: JP-A 2001-215331
Patent Document 2: JP-A 2007-219110

SUMMARY OF THE INVENTION

Problem to Dissolve by the Invention

The object of the invention is to provide a method for producing an optical film free from problems of undulation and partial light leakage, by laminating a melted composition containing cellulose ester resin and an acrylic resin via co-extrusion, without generation of wrinkle or film break in a stretching or slitter process, as well as to provide an optical film produced y the method, a polarizing plate and a liquid crystal display device employing it.

Technical Means to Dissolve the Problems

The problems of the invention described above are attained by the following means.
1. A method for producing an optical film by laminating a cellulose ester resin layer (A) and an acrylic resin layer (B) via coextrusion of a melted composition of a cellulose ester resin and a melted composition of an acrylic resin, wherein
the cellulose ester resin layer (A) contains 55 to 99% by mass of cellulose ester resin, and 1 to 45% by mass of acrylic resin, wherein total content of the cellulose ester resin and acrylic resin is 100% by mass,
the acrylic resin layer (B) contains 55 to 99% by mass of an acrylic resin, and 1 to 45% by mass of a cellulose ester resin, wherein total content of the cellulose ester resin and acrylic resin is 100% by mass,
when coextruded web is conveyed while cooling by a first cooling roll and a second cooling roll arranged subsequent to the first cooling roll, the coextruded web is conveyed while the cellulose ester resin layer (A) being in contact with a surface of the first cooling roll, and the acrylic resin layer (B) being in contact with a surface of the second cooling roll, and Ta (° C.) and Tb (° C.) satisfy the following relation 1, wherein Ta (° C.) is a surface temperature of the first cooling roll, and Tb (° C.) is a surface temperature of the second cooling roll, $(Ta-80)° C. < Tb(° C.) < (Ta-5)° C.$   Relation 1

2. The method for producing an optical film described in 1, wherein tan δa at a surface temperature of the first cooling roll Ta (° C.) satisfies $0.1 \leq \tan δa \leq 0.5$, wherein tan δa is a value of tan δ obtained by measuring dynamic viscoelasticity of a film formed by melt extrusion of melted composition of resin in the cellulose ester resin layer (A) in a single layer, measured in a range from 0° C. to 120° C. at measuring frequency of 1 Hz, and
tan δb at a surface temperature of the second cooling roll Tb (° C.) satisfies $0.05 \leq \tan δb \leq 0.2$, wherein tan δb is a value of tan δ obtained by measuring dynamic viscoelasticity of a film formed by melt extrusion of melted composition of a resin in the acrylic resin layer (B) in a single layer, measured in a range from 0° C. to 120° C. at measuring frequency of 1 Hz.
3. The method for producing an optical film described in 1 or 2, wherein the cellulose ester resin satisfies formulas (1), (2) and (3), $2.40 \leq X+Y \leq 3.00$   (1)

$0 \leq X \leq 2.40$   (2)

$0.10 \leq Y \leq 3.00$   (3)

in the formulas, X represents an average substitution degree by acetyl group at 2, 3 and 6 positions, Y represents sum of an average substitution degree by acyl group having 3 to 5 carbon atoms at 2, 3 and 6 positions.

4. An optical film produced by a method for producing an optical film described in any one of 1 to 3 above.

5. A polarizing plate employing the optical film described in 4 above.

6. A liquid crystal display employing the polarizing plate described in 5 above.

Advantage of the Invention

A method for producing an optical film free from problems of undulation and partial light leakage, by laminating a melted composition containing cellulose ester resin and an acrylic resin via co-extrusion, without generation of wrinkle or film break in a stretching or slitter process, can be provided, as well as an optical film produced y the method, a polarizing plate and a liquid crystal display device employing it can be provided.

EMBODIMENTS TO PRACTICE THE INVENTION

Figure 1:
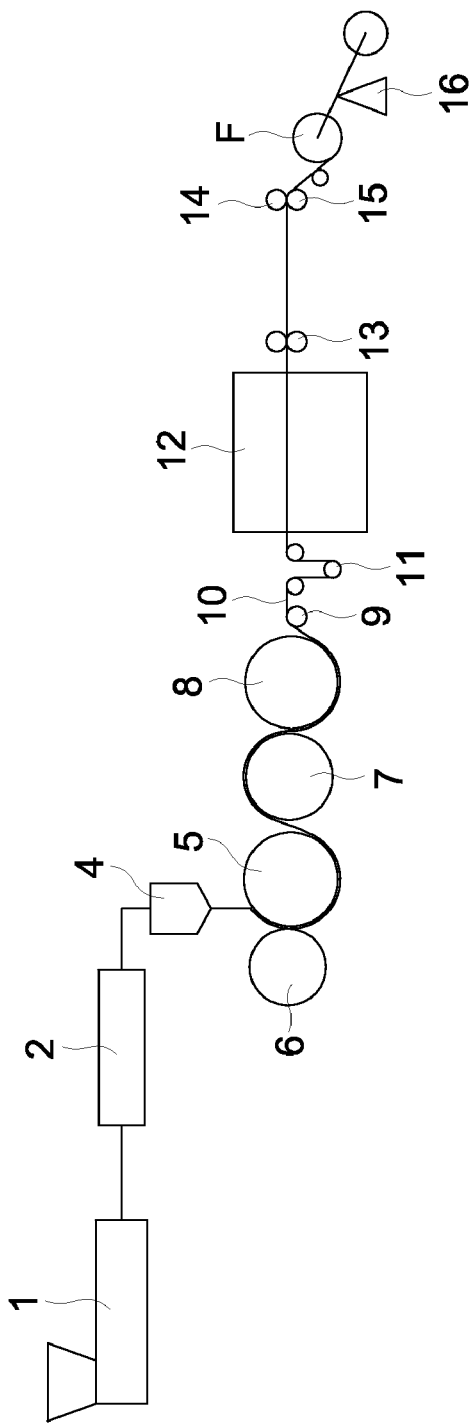
FIG. 1 is outline flow sheet showing one of embodiments of apparatus practicing the film forming method of cellulose ester film of the invention.

The best embodiment to practice the invention is described in detail below, however the invention is not limited to these.

The optical film of the invention is characterized in that the optical film has a form in which a cellulose ester resin layer (A) and an acrylic resin layer (B) are laminated by coextrusion of a melted composition of a cellulose ester resin and melted composition of an acrylic resin, and is a laminated type optical film in which the cellulose ester resin layer (A) contains 55 to 99% by mass of cellulose ester resin, and 1 to 45% by mass of acrylic resin, wherein total content of the cellulose ester resin and acrylic resin is 100% by mass, and the acrylic resin layer (B) contains 55 to 99% by mass of an acrylic resin, and 1 to 45% by mass of a cellulose ester resin, wherein total content of the cellulose ester resin and acrylic resin is 100% by mass.

<Acrylic Resin Layer (B)>

The acrylic resin layer (B) contains 55 to 99% by mass of an acrylic resin, preferably 60 to 99% by mass and 1 to 45% by mass of a cellulose ester resin, preferably 1 to 40% by mass wherein total content of the cellulose ester resin and acrylic resin is 100% by mass.

In case the content of the acrylic resin component becomes large, dimension variation at higher temperature and higher moisture condition is inhibited, and curl of the polarizing plate warping of the panel can be reduced markedly, and the physical properties described above can be maintained for a long time when it is used as the polarizing plate. When the acrylic resin content is less than 55% by mass, light leakage, curl and flatness after forming a polarizing plate deteriorate. On the other side when exceeding 99% by mass, close adhesion property at interface between laminates and flatness of the optical film is inferior. Therefore it is effective to fall within the above described range.

When the optical film of the invention is used in a polarizing plate protective film, it is suitable for a protective film at viewing side or back light side.

The mixing ratio can be determined by obtaining the dynamic viscoelasticity of the resin component since the mixing ratio range described above is a factor to control the dynamic viscoelasticity described in claim 2.

It is preferable that the acrylic resin layer of the invention does not cause ductile failure. The ductile failure of the invention is caused by acting larger stress than the strength of the material, and is defined as a breakdown accompanying remarkable extraction and drawing of a material to the final break. It is featured by that innumerable dents called dimples are formed on the break surface.

Consequently, acrylic resin layer which does not cause ductile failure is characterized in that breakdown such as break is not observed when large stress is allowed to applied such as two-folding the film.

The acrylic-resin layer (B) related to the invention preferably has a tensile softening point of 110 to 145° C., more preferably is controlled in 120 to 140° C. considering the use under a high temperature circumstance.

The acrylic-resin layer (B) of the invention preferably has a glass transition temperature of 110° C. or higher, more preferably 120° C. or higher, and particularly preferably 150° C. or higher.

The glass transition temperature is Midpoint glass transition temperature (Tmg) which is evaluated by using Differential scan calorimeter (DSC-7 produced by Perkin Ehner) under the condition that temperature was raised at a rate of 20° C./minute and by calculation based on JIS K7121 (1987).

In the acrylic-resin layer (B) of the invention, a number of defects having diameter of 5 μm or more in a film surface are preferably at most 1/10 cm square, more preferably at most 0.5/10 cm square and further preferably at most 0.1/10 cm square.

Herein, a diameter of a defect means a diameter when the defect is circle and when the defect is not circle, a maximum size (a circumscribed circle diameter) decided by observation of bounds of the defect via microscope via a method below.

When a defect is a bubble or a foreign matter, bounds of the defect is observed as a size of a shadow by transmitted light of a differential interference microscope.

When a defect is a change of a surface geometry such as a transfer printing of a blemish on a roll or a scratch, a size of the defect is confirmed by a reflected light of a differential interference microscope.

Here, when a size of a defect is indefinite by the observation of reflected light, aluminum or platinum is vapor-deposited on the surface and then is observed.

In order to obtain a film in high productivity having excellent performance represented by this defect frequency, it is effective to filter a polymer solution precisely just before casting, to maintain high cleanness around casting machines, and to dry effectively suppressing foam formation by setting a stepwise drying condition after casting.

For example, in case that a number of defects are 1/10 can square or more, a breaking of the film may occur from defect as origin and productivity may extremely decrease when a tension is applied to the film at after treatment process.

Further when a diameter of a defect exceeds 5 μm or more, the defect can be observed by visual inspection through a polarizing plate and a bright spot may occur in the case of using as an optical member.

Even in the case that a defect cannot be observed by a visual inspection, a defect (coating loss) may be appeared because that coating material cannot be coated uniformly when a hard coat layer is formed onto the film.

Further, in the acrylic-resin layer (B) of the invention, a breaking elongation at least of one direction based on JIS-K7127-1999 is preferably 10% or more, more preferably 20% or more.

The upper limit of the breaking elongation is not limited thereto and is 250% practically. It is effective to reduce a foreign matter or defect in film due to bubble, in order to increase breaking elongation.

The thickness of the acrylic-resin layer (B) in the acrylic-resin-containing film of the invention is preferably 5 μm or more and more preferably 10 μm or more.

The thickness of the film can be optionally selected in accordance with the usage.

In the acrylic-resin layer (B) of the invention, a transmittance of all light is preferably 90% or more, more preferably 93% or more and the upper limit is about 99% practically. In order to achieve the transmittance of all light, it is effective not to introduce additive or copolymerization component which absorb visible light, or to reduce light diffusion or absorption in the film by eliminating foreign matter in polymer by precise filtration.

In the acrylic-resin layer (B) of the invention, a haze value (or turbidity) which is one of index of transparency is preferably less than 2.0%, more preferably less than 0.5%.

In order to achieve the haze value, it is effective to reduce light diffusion in the film by eliminating foreign matter in polymer by precise filtration.

The transmittance of all light and the haze value of the acrylic resin layer (B) are those measured in accordance with JIS-K7361-1-1997 and JIS-K7136-2000.

The acrylic resin layer (B) of the invention may contain a resin other than the acrylic resin and the cellulose ester resin. It is preferable that the resin is Resin (D) having Abbe number of 30 to 60 in this instance <Acrylic Resin>

Acrylic resins employed in the invention include methacrylic resins. These resins are not particularly limited, and preferred resins include those which are composed of methyl methacrylate units of 50 to 99% by mass and other monomer units of 1 to 50% by mass which are copolymerizable with the above.

Other copolymerizable monomers include α,β-unsaturated acids such as alkyl methacrylate, in which the number of carbon atoms of the alkyl group is 2 to 18, alkyl acrylate, in which the number of carbon atoms of the alkyl group is 1 to 18, acrylic acid, or methacrylic acid; unsaturated group containing divalent carboxylic acids such as maleic acid, fumaric acid, or itaconic acid; aromatic vinyl compounds such as styrene, α-methylstyrene or nuclear substituted styrene; and α,β-unsaturated nitriles such as acrylonitrile or methacrylonitrile; as well as maleic anhydride, maleimide, N-substituted maleimide, and glutaric anhydride. These may be employed individually or in combinations of at least two types.

Of these, in view of heat-decomposition resistance and fluidity of copolymers, preferred are methyl acrylate, ethyl acrylate, n-propyl acrylate, n-butyl acrylate, s-butyl acrylate, and 2-ethylhexyl acrylate, and methyl acrylate and n-butyl acrylate are particularly preferred to be employed.

In view of a mechanical strength of a film and fluidity at a film production process, acrylic resin employed in the acrylic-resin layer (B) of the invention has preferably the weight average molecular weight (Mw) of 80,000 to 1,000,000, and more preferably 100,000 to 280,000.

The weight average molecular weight of acrylic resins of the invention can be determined via gel permeation chromatography. Measurement conditions are as follows.

Solvent: methylene chloride
Columns: Shodex K806, K805, and K803G (produced by Showa Denko K.K., three columns were employed via connections)
Column temperature: 25° C.
Sample concentration: 0.1% by mass
Detector: RI Model 504 (produced by GL Sciences Inc.)
Pump: L6000 (produced by Hitachi Ltd.)
Flow rate: 1.0 ml/minute
Calibration curve: A calibration curve prepared by employing 13 samples of standard polystyrene STK (produced by Tosoh Corp. Mw=2,800,000 to 500) was employed. It is preferable to employ the 13 samples at nearly equal intervals.

The manufacturing methods of acrylic resin in the invention are not particularly limited, and employed may be any of the conventional methods such as suspension polymerization, emulsion polymerization, bulk polymerization, or solution polymerization. As a polymerization initiator, employed may be common peroxide based and azo based ones. Further, redox based ones may be included.

With regard to polymerization temperature, the suspension or emulsion polymerization may be carried out between 30 and 100° C., while the bulk or solution polymerization may be carried out between 80 and 160° C. In order to control the reduction viscosity of the resulting copolymer, polymerization may be carried out employing alkylmercaptan as a chain transfer agent.

Both heat resistance and brittleness can be improved compatibly by using this molecular weight.

As the acrylic resin of the invention, also employed may be commercial ones. Examples thereof include DELPET 60N and 80N (both produced by Asahi Kasei Chemicals Co., Ltd.), DIANAL BR52, BR80, BR83, BR85, and BR88 (all manufactured by Mitsubishi Rayon Co., Ltd.), and KT75 (produced by Denki Kagaku Kogyo K. K.).

As the acrylic resins of the acrylic-resin layer (B) according to the invention, one or more species of the acrylic resins may be used and a weight-average molecular weight of each acrylic resin is 80,000 to 1,000,000.

It is preferable that acrylic resin layer (B) of the invention satisfies the relation described by the following formulas of (i) to (iv), and has a tensile softening point of 105 to 145° C. and photoelastic coefficient of $-5.0 \times 10^{-8}$ cm$^2$/N to $8.0 \times 10^{-8}$ cm$^2$/N, as an acrylic resin layer (B) solely.

$$|Ro(590)| \leq 10 \text{ nm} \quad (i)$$

$$|Rth(590)| \leq 20 \text{ nm} \quad (ii)$$

$$|Ro(480)-Ro(630)| \leq 5 \text{ nm} \quad (iii)$$

$$|Rth(480)-Rth(630)| \leq 10 \text{ nm} \quad (iv)$$

Here Ro and Rth are defined as Ro=(nx−ny)×d, and Rth={(nx+ny)/2−nz}×d, in the formulas, nx represents a refractive index in retarded phase axis direction in a plane of the optical compensation film, ny represents a refractive index in a direction perpendicular to the retarded phase axis direction in a plane, nz represents a refractive index in a thickness direction and d represents a thickness in rim of the film respectively.

Values 590, 480 and 630 in parentheses ( ) are the measuring wavelength for the refractive index in nm. The photoelastic coefficient is a value measured at 590 nm.

The acrylic resin layer (B) of the invention is an acrylic resin containing layer containing one acrylic resin and one cellulose ester resin, and is preferably has a haze value of not more than 2% and more preferably not more than 1%.

<Cellulose Ester Resin (Referred to as Cellulose Ester)>

Cellulose has each one hydroxy group at 2nd, 3rd and 6th positions in one glucose unit, totally 3 hydroxy groups. The substitution degree is a value showing how many acyl groups bond to what position in one glucose unit in average. Therefore, maximum substitution degree is 3.00, and the positions not substituted by the acyl group are usually hydroxy group. Those in which a part or all of the hydroxy groups are substituted by acyl groups are called cellulose ester. The substitution degree of acyl group can be obtained by a method defined by ASTM-D817.

It is preferable that the cellulose ester used in the invention satisfies the all of following formulas (1), (2) and (3), simultaneously, in which sum of average substitution degree at 2nd, 3rd and 6th positions by acetyl group is set as X, and sum of average substitution degree at 2nd, 3rd and 6th positions by acyl group having 3 to 5 carbon atoms is set as Y. The average substitution degree is called simply as substitution degree.

$$2.40 \leqq X+Y \leqq 3.00 \quad (1)$$

$$0 \leqq X \leqq 2.40 \quad (2)$$

$$0.10 \leqq Y < 3.00 \quad (3)$$

wherein, X represents an average degree of substitution of an acetyl group at 2nd, 3rd and 6th position, while Y represent an average degree of substitution of acyl group at 2nd, 3rd and 6th position.

Especially, $1.00 \leqq X \leqq 2.20$, and $0.50 \leqq Y \leqq 2.00$ are preferable, and more preferably $1.20 \leqq X \leqq 2.00$, and $0.70 \leqq Y \leqq 1.70$ Y is preferably a butylyl group and propionyl group, and propionyl group is preferable since the advantage of the invention is obtained and stretching is easily processed.

A cellulose raw material for the cellulose ester used in the invention may be either wood pulp or cotton linter. The wood pulp may be conifer pulp or broad-leaved tree pulp, but conifer pulp is preferable. Cotton linter is preferably used from the viewpoint of peeling properties during film formation. Cellulose esters produced therefrom can be used in appropriate combinations or individually.

Examples of possible use are as follows: the ratios of cotton linter-derived cellulose ester, wood pulp (conifer)-derived cellulose ester, and wood pulp (broad-leaved tree)-derived cellulose ester are 100:0:0, 90:10:0, 85:15:0, 50:50:0, 20:80:0, 10:90:0, 0:100:0, 0:0:100, 80:10:10, 85:0:15, and 40:30:30.

The cellulose ester can be synthesized by referring to known methods, for example, by substituting the hydroxyl group of the material cellulose by the acetic anhydride, anhydrous propionic acid and/or anhydrous butyric acid according to the normal method in such a way that the acetyl group, propionyl group and/or butyl group satisfy the relation defined by formulas of (1), (2) and (3) describe above. There is no restriction to the method of synthesizing such a cellulose ester. For example, it can be synthesized by using the method disclosed in JP-A H10-45804 and H06-501040.

The weight average molecular weight (Mw) of the cellulose ester resin of the invention is not particularly limited, but is preferably 100,000 to 400,000, more preferably 150,000 to 300,000, and most preferably 180,000 to 300,000. The viscoelasticity of the resin composition can be controlled within the range of claim 2, and it is advantageous because there is no inconvenience such as excess melt viscoelasticity or reduced strength of the film when the weight average molecular weight satisfies the above mentioned preferable range.

The ratio of weight average molecular weight (Mw) to number average molecular weight (Mn) Mw/Mn the of the cellulose ester used in the invention is preferably 1.3 to 5.5, more preferably 1.5 to 5.0, further preferably 1.7 to 4.0 and particularly preferably 2.0 to 3.5. When the Mw/Mn exceeds 5.5, it is not preferable because the viscosity becomes higher and is apt to reduce melt filtering performance. It is preferable in view of industrial production performance to be 1.3 or more.

The Mn and Mw/Mn are determined according to Gel permeation chromatography under the following conditions.

The measuring condition is as follows.

Solvent: Tetrahydrofuran
Apparatus: HLC-8220 (produced by Toso Co., Ltd.)
Column: TSK gel Super HM-M (produced by Toso Co., Ltd.)
Column temperature: 40° C.
Sample concentration: 0.1% by weight
Injection amount: 10 µl
Flow rate: 0.6 ml/min
Calibration curve: One obtained employing 9 samples of PS-1 (produced by Polymer Laboratories Corporation) having an Mw of from 2,560,000 to 580.

The content of an alkaline earth metal in the cellulose resin used in the invention is preferably in the range of 1 to 50 ppm. When the content is in the range of 1 to 50 ppm, stain adhering to the lip tends not to occur, or the resin in the slitting section during or after heat casting tends not to break and the advantage of the invention is displayed effectively. The content is further preferably in the range of 1 to 30 ppm. The content of the alkaline earth metal described herein refers to the total content of Ca and Mg, being able to be determined using an X-ray photoelectron spectrometer (XPS).

The content of sulfuric acid remaining in the cellulose resin used in the invention is preferably in the range of 0.1 to 45 ppm in terms of sulfur element. It is conceivable that the residual sulfuric acid is contained in a salt form. In case that the content of the residual sulfuric acid exceeds 45 ppm, an amount of deposits on the die lip section during heat melting is large and also the resin tends to break when being slit during or after heat casting. Therefore, the range of 1 to 30 ppm is more preferable. The content of the residual sulfuric acid can be determined based on ASTM-D817-96.

The content of free acid remaining in the cellulose resin used in the invention is preferably in the range of 1 to 500 ppm. In the range as mentioned above, an amount of deposits on the die lip section does not increase and also the resin does not tend to break. It is particularly preferable in the range of 1 to 70 ppm. The content of remaining free acid can be measured by a method stipulated in ASTM D817-96.

It is preferable to wash more sufficiently synthesized cellulose ester than in the solution extrusion method to keep the remaining content of alkali earth metal, sulfuric acid, and acid in the above described range.

Washing the cellulose ester can be conducted by employing poor solvent such as methanol and ethanol in addition to water, or a mixture solvent of poor solvent with good solvent as far as it is poor solvent as the result, and inorganic substance other than remaining acid and low molecular weight organic impurities can be removed.

The cellulose ester is washed preferably in the presence of a deterioration inhibitor. This will improve the heat resistance and film formation stability of the cellulose ester.

The deterioration inhibitors can be used without limitation as far as it inactivate the radical generated in the cellulose ester or inhibit deterioration due to addition of oxygen to radical generated in the cellulose ester and preferable examples include a hindered phenol, a hindered amine, and a phosphorus-containing compound.

To improve the heat resistance, mechanical property and optical property of the cellulose ester, the cellulose ester is subjected to reprecipitation in the poor solvent and filtration or subjected to stirring and suspended in the poor solvent and filtration, subsequent to dissolution of the good solvent of the cellulose ester. This will remove the low molecular weight component and other impurities of the cellulose ester. In this case, similarly to the aforementioned case of washing the cellulose ester, washing is preferably carried out in the presence of a deterioration inhibitor as described above. The deterioration inhibitor used in the washing process may be remained in the cellulose ester after washing. The remaining amount is preferably 0.01 to 2,000 ppm, more preferably 0.05 to 1,000 ppm, and further preferably 0.1 to 100 ppm. The other polymer or low molecular weight compounds may be added after reprecipitation process of the cellulose ester. The content of the cellulose ester is preferably 60 to 99% by mass of the cellulose ester film of the invention.

The cellulose ester used in the present invention preferably exhibits less bright spot foreign matter when formed into a film. The bright spot foreign matter is brightening spots of light coming out of a light source when a cellulose ester film is disposed between two perpendicularly disposed polarizing plates (cross Nicol), illuminated by a light source from one side and observed from the other side. Polarizing plates used for evaluation are desirably ones which are constituted of a protective film having no bright spot foreign matter and ones using a glass plate for protection of the polarizing plates. One of the causes for the bright spot foreign matter is assumed to be due to non-esterified or low-esterified cellulose, so that bright spot foreign matter can be removed by using a cellulose ester of reduced bright spot foreign matter (or using a cellulose ester exhibiting a low dispersion in degree of substitution) and by filtering a melted cellulose ester or passing it through a filtration step in at least either the latter stage of cellulose ester synthesis or in the stage of obtaining precipitates.

There are tendencies that thinner film results in fewer numbers of bright foreign matter spots per unit area and a lower cellulose ester content of the film forms less bright spot foreign matter. The number of bright foreign matter spots having a spot diameter of 0.01 mm or more is preferably not more than 200 spots/cm$^2$, more preferably not more than 100 spots/cm$^2$, still more preferably not more than 50 spots/cm$^2$, and further still more preferably not more than 30 spots/cm$^2$, and yet further still more preferably not more than 10 spots/cm$^2$, while none is most preferred. The number of bright foreign matter spots having a spot diameter of 0.005 to 0.01 mm is also preferably not more than 200 spots/cm$^2$, more preferably not more than 100 spots/cm$^2$, still more preferably not more than 50 spots/cm$^2$, and further still more preferably not more than 30 spots/cm$^2$, and yet further still more preferably not more than 10 spots/cm$^2$, while none is most preferred.

When removing bright spot foreign matter through melt filtration, filtering a cellulose composition mixed with additives, for example, a plasticizer and a deterioration inhibitor is preferred in terms of enhanced efficiency for removing bright spot foreign matter rather than filtering a melt of a cellulose ester alone. Reduction can also be achieved through filtration of the solution of a cellulose ester in a solvent in the synthesis process of the cellulose ester. A cellulose ester appropriately mixed with a UV absorber or other additive may also be filtered. A melt of a cellulose ester is filtered preferably at a viscosity of not more than 10,000 Pa·s, more preferably not more than 5,000 Pa·s, further more preferably not more than 1,000 Pa·s and still further more preferably not more than 500 Pa·s. There are preferably used, as a filtering material, conventionally known materials such as glass fibers, cellulose fibers, filtration paper and a fluororesin such as tetrafluoroethylene resin. Specifically, ceramics and metals are preferably used. The absolute filtration precision of a filter is preferably not more than 50 μm, more preferably not more than 30 μm, still more preferably not more than 10 μm, and further still more preferably not more than 5 μm. These may be optimally combined. A filter material may be the surface type or the depth type one but the depth type is preferred in terms of being reduced tendency to clog.

One or more kinds of cellulose esters can be used.

The cellulose ester used in the cellulose ester resin layer (A) described later can be used as itself for the cellulose ester.

Resin (D) Other than Acryl Resin (A) and Cellulose Ester Resin and Exhibiting Abbe's Number of 30-60

A resin (D) used in the invention is a resin except for an acryl resin and a cellulose ester resin, and exhibits an Abbe's number of 30 to 60.

The use of a resin of a Abbe's number falling within the foregoing range can control so that the wavelength distribution characteristic of a film falls within the preferred range of the invention, that is, $$|R_o(480)-R_o(630)| \leq 5 \text{ nm}$$

$$|R_{th}(480)-R_{th}(630)| \leq 10 \text{ nm}$$

and thereby, its use as a liquid crystal display makes it feasible to inhibit discoloring, coloring or the like of a liquid crystal display, so-called color shift and to achieve enhanced contrast in all directions.

There may be employed various resins (D) within a range not to vitiate the physical properties of the acryl resin-containing film of the inventions.

Specific examples thereof include methyl(meth)acrylate-styrene resin (styrene ratio of more than 50% by mass), copolymer of styrene and an unsaturated group-containing bivalent carboxylic acid and an aromatic vinyl compound such as styrene, α-methylstyrene or nuclear-substituted styrene, for example, styrene-maleic acid anhydride, styrene-fumaric acid, styrene-itaconic acid or styrene-N-substituted maleimide; an indene copolymer such as indene-styrene resin or indene-methyl(meth)acrylate resin (in a copolymer with acrylate, the ratio of indene exceeds 50% by mass); olefin-maleimide copolymer, polycarbonate, poly cycloolefin and octaacetyl saccharose.

Specifically, methyl(meth)acrylate resin (Abbe's number: 35-52), indene-methyl(meth)acrylate copolymer (Abbe's number: 34-51), indene-coumarone copolymer (Abbe's Number: 35-40) and the like easily come into effects of the invention and are preferably used.

There is also commercially available KT 75 (made by Denki Kagaku Kogyo Kabushiki Kaisha, methyl methacrylate-styrene copolymer, Abbe's Number: 46).

The Abbe's number was measured according to the method known in the art. Specifically, using an Abbe refractometer, the refractive indexes nc, nd and of in Fraunhofer C-line (656.3 nm), D-line (590.3 nm) and F-line (486.1 nm) are measured, respectively, and the Abbe's number is calculated according to the following equation:

$$\text{Abbe's number } (\nu d) = (nd-1)/(nf-nc)$$

It is preferred to conduct a miscibility test in advance to choose a resin (D) miscible with the acrylic resin and cellulose ester resin.

Specifically, the miscibility test is conducted in such a manner that 5% solutions in which resins (A), (B) and (D) were each dissolved in 100 ml methylene chloride were mixed to measure turbidity or visual observation of the mixing state. This test readily makes it possible to choose a resin.

<Other Additives>

Plasticizers can be used simultaneously in the acrylic-resin layer (B) of the invention, in order to enhance fluidity and flexibility of the composition.

Plasticizers may be phthalic acid based, aliphatic acid ester based, trimellitic acid ester based, phosphoric acid ester base, polyester based, or epoxy based.

Polyester based and phthalic acid based plasticizers are preferably employed among them. The polyester based plasticizers are superior in non-mobility and extraction resistance, but are slightly inferior in plasticizing effects and miscibility to phthalic acid ester based plasticizers such as dioctyl phthalate.

Consequently, they may be used for a wide range of applications by selecting or simultaneously employing these plasticizers depending on intended use.

Polyester based plasticizers are reactants of mono- to tetravalent carboxylic acid with mono- to hexahydric alcohol, and those, which are prepared by allowing divalent carboxylic acid to react with glycol, are mainly employed. Representative divalent carboxylic acids include glutaric acid, itaconic acid, adipic acid, phthalic acid, azelaic acid, and sebacic acid.

Particularly, the use of adipic acid and phthalic acid enables preparation of those which are excellent in plasticizing characteristics. Glycols include glycol of ethylene, propylene, 1,3-butyrene, 1,4-butyrene, and dipropylene.

These divalent carboxylic acids and glycols may be employed individually or in combinations.

The above ester based plasticizers may be any of the ester, oligoester or polyester type. The molecular weight is preferably in the range of 100 to 10,000, but is more preferably in the range of 600 to 3,000, at which range plasticizing effects are marked.

Further, viscosity of plasticizers correlates with their molecular structure and weight. In the case of adipic acid based plasticizers, the viscosity is preferably in the range of 200 to 5,000 MP·s (at 25° C.) from the relation with plasticization efficiency. Further, several polyester based plasticizers may be simultaneously employed.

It is preferable that 0.5 to 30 parts by mass of plasticizers are added to 100 parts by mass of the composition containing the acrylic resin (A). However, it is not preferable that in practice, the added amount of the plasticizers exceeds 30 parts by mass, since the surface becomes sticky.

It is preferable that the composition containing the acrylic resin of the invention contains UV absorbers. Employed UV absorbers include those which are benzotriazole based, 2-hydroxybenzophenone based, and salicylic acid phenyl ester based. For example, cited may be triazoles such as 2-(5-methyl-2-hydroxyphenyl)benzotriazole, 2-[2-hydroxy-3,5-bis(α,α-dimethylbenzyl)phenyl]-2H-benzotriazole, and 2-(3,5-di-t-butyl-2-hydroxyphenyl)benzotriazole, as well as benzophenones such as 2-hydroxy-4-methoxybenzophenone, 2-hydroxy-4-octoxybenzophenone, or 2,2'-dihydroxy-4-methoxybenzophenone.

Further, in order to minimize thermal decomposition and thermal staining during molding, it is possible to add various antioxidants to acrylic resin used in the acrylic-resin layer (B) of the invention. Still further, it is possible to provide the acrylic-resin layer (B) with antistatic capability by addition of antistatic agents.

In the acrylic resin composition of the invention, fire resistant acrylic resin compositions blended with phosphor based fire retardants may be employed.

As phosphor based fire retardants employed here, listed may be mixtures incorporating at least one selected from red phosphorous, triaryl phosphoric acid esters, diaryl phosphoric acid esters, monoaryl phosphoric acid esters, aryl phosphonic acid compounds, aryl phosphine oxide compounds, condensed aryl phosphoric acid esters, halogenated alkyl phosphoric acid esters, halogen-containing condensed phosphoric acid esters, halogen-containing condensed phosphonic acid esters, and halogen containing phosphorous acid esters.

Specific examples thereof include triphenyl phosphate, 9,10-dihydro-9-oxa-10-phosphaphenantholene-10-oxide, phenylphosphonic acid, tris(β-chloroethyl)phosphate, tris (dichloropropyl)phosphate, and tris(tribromoneopentyl) phosphate.

<<Cellulose Ester Resin Layer (A)>>

The cellulose ester resin layer (A) of the invention is a layer containing 55 to 99% by mass of cellulose ester resin and 1 to 45% by mass of acrylic resin taking the sum of the cellulose ester resin and acrylic resin being 100%. It is preferable to composed of 60 to 99% by mass of cellulose ester resin and 1 to 40% by mass of acrylic resin.

Saponification suitability is inferior and productivity is low in the preparation process of polarizing plate interposing the polarizing element when the content of the cellulose ester resin is not more than 55% Adhesion between the optical films becomes degraded due to inferior saponification suitability after forming polarizing plate, and therefore, dependency of the polarizing plate on humidity becomes high and apt to cause light leakage. It is effective to adjust in the above described range since flatness of optical film is not good and adhesion at an interface between laminates is inferior when the content is more than 99% by mass.

The ratio is determined by obtaining dynamic viscoelasticity of the resin composition sine the range described above becomes a factor to control the dynamic viscoelasticity as described in claim 2.

<Cellulose Ester>

The cellulose ester used in the acrylic resin layer (B) described above can be used as itself for the cellulose ester in the invention.

The following cellulose ester can be used as well.

It is preferable that the cellulose to be used is a carboxylic acid ester having carbon atoms of around 2 to 22, which may be an aromatic carboxylic acid ester, and the cellulose ester of a lower aliphatic acid having small number of carbon atoms in particular.

The lower aliphatic acid in the cellulose ester of the lower aliphatic acid ester is an aliphatic acid having 6 or less carbon atoms. An acyl group bonded to hydroxy group may be straight or branched or forming a ring, and further may have another substituent.

In case of same substitution degree, it is preferable to select among the acyl group having carbon atoms of 2 to 6 as the number of carbon atoms.

It is particularly preferable that the cellulose ester of the invention satisfies the following formulas (a) and (b) simultaneously.

$$2.4 \leq X+Y \leq 3.0 \tag{a}$$

$$0.1 \leq Y \leq 1.5 \tag{b}$$

In the formulas, X is a substitution degree of acetyl group and Y is a substitution degree of propionyl or butylyl group, and X+Y is a substitution degree of total acyl group.

The cellulose acetate propionate is used particularly preferably among these. The substitution degree of acyl group is measured by a method in accordance with ASTM-D817-96.

It is preferable that the cellulose ester has a molecular weight of a number average molecular weight (Mn) is 60,000 to 300,000 and more preferably 70,000 to 200,000.

It is preferable that the cellulose ester used in the invention has a weight average molecular weight (Mw)/a number average molecular weight (Mn) is not more than 4.0 and more preferably 1.4 to 2.3.

The average molecular weigh and molecular weight distribution can be measured via gel permeation chromatography (GPC), and number average molecular weight (Mn), weight average molecular weight (Mw) are calculated and the ratio is also calculated using these.

The measuring condition may be the same as described above.

The cellulose ester resin layer (A) in the optical film of the invention has thickness of 10 to 250 μm, and more preferably 20 to 150 μm, singly in each.

The cellulose ester resin layer (A) of the invention may contain a low molecular weight acrylic type polymer in addition to the acrylic resin used in the acrylic resin layer (B).

The acrylic type polymer preferably display a negative birefringence property in a stretching direction as its function when it is incorporated in the optical film, and is preferably a polymer having a weight average molecular weight of 500 to 40,000 and obtained by polymerizing ethylenic unsaturated monomers, wherein the chemical structure is not particularly restricted.

(Test Method of Birefringence Property of Acrylic Type Polymer)

Acrylic type polymer was dissolved in a solvent, and film was formed by casting, drying by heat, then birefringence property was evaluated in the film having transparency of 80% or higher.

Index of refraction was measured via Abbe Refractometer 4T (product by ATAGO Co., Ltd.) employing multi-wavelength light source. Index of refraction in stretching direction is made ny, and that of intra plain perpendicular to it is made nx. It is considered that (meth)acrylic type polymer has negative birefringence property in a stretching direction as for the film having (ny−nx)<0 in each index of refraction at 550 nm.

The acrylic type polymer used in the invention having a weight average molecular weight of 500 to 40000 may be acrylic type polymer having an aromatic group in a side chain or acrylic type polymer having a cyclohexyl group in a side chain.

Good solubility of the cellulose ester resin with the polymer having weight average molecular weight of the polymer of 500 to 40,000 is obtained by controlling the component of the polymer.

The acrylic type polymer having an aromatic group in a side chain or the acrylic type polymer having a cyclohexyl group in a side chain is preferably has a weight average molecular weight of 500 to 10,000, and these contribute to an excellent performance of the protective film for a polarizing plate such as excellent in transparency and very low moisture vapor permeability after cellulose ester film forming, in addition thereto.

The polymer has a weight average molecular weight of 500 to 40,000, which is considered between an oligomer and a low molecular weight polymer. It is difficult to control the molecular weight in the usual polymerization of these polymers, and it is preferable to employ a method to obtain uniform molecular weight not to make the molecular weight so large.

The acrylic polymer is preferably polymer X having a weight average molecular weight of 2,000 to 40,000 which is prepared by copolymerization of an ethylenic unsaturated monomer Xa having no aromatic ring nor hydroxy group in a molecule, and an ethylenic unsaturated monomer Xb having a hydroxy group but not aromatic ring, and an ethylenic unsaturated monomer other than Xa and Xb; or polymer Y having a weight average molecular weight of 500 to 5,000 which is prepared by polymerization of an ethylenic unsaturated monomer Ya having no aromatic ring and an ethylenic unsaturated monomer which is polymerizable with Ya.

The cellulose ester resin layer (A) is preferably comprises the polymer X having a weight average molecular weight of 2,000 to 30,000, which is prepared by copolymerization of ethylenically unsaturated monomer Xa containing no aromatic ring nor a hydroxy or amide group in a molecule, ethylenically unsaturated monomer Xb containing a hydroxy or amide group but not aromatic ring in a molecule and a polymerizable ethylenic unsaturated monomer other than Xa and Xb; or the low molecular weight polymer Y having a weight average molecular weight of 500 to 5,000 which is prepared by polymerization of an ethylenic unsaturated monomer Ya having no aromatic ring and an ethylenic unsaturated monomer which is polymerizable with Ya.

Polymer X employed in the invention is a polymer having a weight average molecular weight of 2,000 to 40,000, which is prepared by copolymerization of ethylenically unsaturated monomer Xa containing no aromatic ring nor a hydroxy or amide group in a molecule, ethylenically unsaturated monomer Xb containing a hydroxy or amide group but not aromatic ring in a molecule and a polymerizable ethylenic unsaturated monomer other than Xa and Xb.

Xa is preferably an acryl or methacryl monomer having no aromatic ring and no hydroxy or amide group in a molecule, and Xb is preferably an acryl or methacryl monomer having no aromatic ring but having a hydroxy or amide group, in a molecule.

Polymer X is represented by following Formula (X):

$$-(Xa)_m-(Xb)_n-(Xc)_p-$$ Formula (X)

In the Formula (X), Xa is an ethylenically unsaturated monomer containing no aromatic ring nor a hydroxy or amide group in a molecule, Xb is an ethylenically unsaturated monomer containing a hydroxy or amide group but not aromatic ring in a molecule and Xc is a polymerizable ethylenic unsaturated monomer other than Xa and Xb. M, n and p is a mole composition ratio, respectively, wherein m is not zero, and sum of m, n and p is 100.

And Polymer X is more preferably a polymer represented by following Formula (X-1).

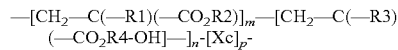
$$-[CH_2-C(-R1)(-CO_2R2)]_m-[CH_2-C(-R3)(-CO_2R4-OH)-]_n-[Xc]_p-$$

In the Formula, R1 and R3 is H or $CH_3$. R2 is an alkyl group or a cycloalkyl group having a carbon number of 1 to 12. R4 is $-CH_2-$, $-C_2H_4-$ or $-C_3H_6-$. Xc is a monomer unit polymerizable with Xa and Xb. m, n and p are a mole composition ratio. Herein, m≠0, n≠0 and k≠0; and m+n+p=100.

Monomer as a monomer unit constituting Polymer X of the invention will be listed below; however, this invention is not limited thereto.

The term "hydroxy group" in X includes a group having ethylene oxide chain in addition to hydroxy group.

Ethylenically unsaturated monomer Xa which has no aromatic ring nor hydroxy or amide group in a molecule includes such as methylacrylate, ethyl acrylate, (i-, n-) propyl acrylate, (n-, s-, t-) butyl acrylate, (n-, s-) pentyl acrylate, (n-, i-) hexyl acrylate, (n-, i-) heptyl acrylate, (n-, i-) octyl acrylate, (n-, i-) nonyl acrylate, (n-, i-) myristyl acrylate, (2-ethylhexyl) acrylate and (ε-caprolactone) acrylate; or those in which acrylic ester described above are converted to methacrylic ester. Among them, methyl acrylate, ethyl acrylate, methyl methacrylate, ethyl methacrylate and (n-, i-)propyl acrylate are preferable.

Ethylenically unsaturated monomer Xb, which has no aromatic ring but has a hydroxy or amide group, is preferably an acrylic ester or methacrylic ester as a monomer unit having a hydroxyl group, and includes (2-hydroxyethyl)acrylate, (2-hydroxypropyl)acrylate, (3-hydroxypropyl)acrylate, (4-hydroxybutyl)acrylate and (2-hydroxybutyl)acrylate; or those in which these acrylic acid is replaced by methacrylic acid; and preferably (2-hydroxyethyl)acrylate, (2-hydroxyethyl)methacrylate, (2-hydroxypropyl)acrylate and (3-hydroxypropyl)acrylate.

Monomer units having amide group in Xb include N-vinylpyrrolidone, N-acryloyl morpholine, N-vinyl piperidone, N-vinyl caprolactam, acrylamide, N,N-dimethyl acrylamide, N-isopropyl acrylamide, N,N-dimethylaminopropyl acrylamide, N,N-diethyl acrylamide, N-hydroxyethyl acrylamide, N-vinyl acetamide and the like.

Xc is not specifically limited provided being ethylenically unsaturated monomer other than Xa and Xb, and capable of copolymerization with Xa and Xb, and is preferably those having no aromatic ring.

The mole composition ratio m/n of Xa and Xb is preferably in a range of 99/1 to 65/35, and more preferably in a range of 95/5 to 75/25. p of Xc is 0 to 10. Xc may be plural monomer units.

when a mole composition ratio of Xb is over the above-described range, there is a tendency of causing haze at the time of film forming, and it is preferable to determine mole composition ratios of Xa and Xb so as to optimize these effects.

The molecular weight of high molecular weight polymer X is 5,000 to 40,000, more preferably 5,000 to 20,000.

By setting the weight average molecular weight to not less than 5,000, it is preferable that obtained can be advantages such as small dimension variation of cellulose ester film under high temperature and high humidity and small curl as polarizing plate protective film.

When the weight average molecular weigh is not more than 40,000, compatibility with cellulose ester is more improved, and bleeds out under high temperature and high humidity as well as generation of haze immediately after casting will be restrained.

The weight average molecular weight of polymer X can be controlled by a molecular weight controlling method known in the art. Such a molecular weight controlling method includes a method to incorporate a chain transfer agent such as carbon tetrachloride, lauryl mercaptan and octyl thioglycolate.

Polymerization temperature is usually from room temperature to 130° C., preferably 50 to 100° C., and it is also possible to adjust the temperature or polymerization reaction time.

The weight average molecular weight can be determined by the following manner.

(Measuring Method of Weight Average Molecular Weight)

The weight average molecular weight and the number average molecular weight were measured via gel permeation chromatography (GPC). Measurement conditions are described previously.

Polymer Y is a polymer which is prepared by polymerization of an ethylenically unsaturated monomer Ya and has a weight molecular weight of 500 to 5,000. When a weight average molecular weight is not less than 500, it is preferable that residual monomer in polymer is decreased.

Further, to set the molecular weight of not more than 5,000, it is preferable that retardation value Rth decreasing capability is maintained. Ya is preferably an acryl or methacryl monomer having no aromatic rings.

Polymer Y of this invention is represented by following Formula (Y).

$(Ya)_k$-$(Yb)_q$-          Formula (Y)

In the formula (Y), Ya is an ethylenic unsaturated monomer having no aromatic ring and Yb is an ethylenic unsaturated monomer which is polymerizable with Ya. k and q are a mole composition ratio, wherein, k≠0, and k+q=100.

Further, Polymer Y of this invention is more preferably polymer represented by following Formula (Y-1).

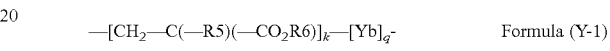
—[CH$_2$—C(—R5)(—CO$_2$R6)]$_k$—[Yb]$_q$-          Formula (Y-1)

In the Formula, R5 is H or CH$_3$. R6 is an alkyl group having a carbon number of 1 to 12 or a cycloalkyl group. Yb is a monomer unit polymerizable with Ya. k and q are a mole composition ratio, wherein, k≠0, and k+q=100.)

Yb is not specifically limited provided being an ethylenically unsaturated monomer which is copolymerizable with Ya. Yb may be plural monomers. k+q=100, and q is preferably 0 to 30.

Ethylenically unsaturated monomer Ya, which constitutes polymer Y prepared by polymerizing ethylenically unsaturated monomer having no aromatic ring, includes acrylic ester such as methyl acrylate, ethyl acrylate, (i-, n-)propyl acrylate, (n-, s-, t-)butyl acrylate, (n-, s-)pentyl acrylate, (n-, i-)hexyl acrylate, (n-, i-)heptyl acrylate, (n-, i-)octyl acrylate, (n-, i-)nonyl acrylate, (n-, i-) myristyl acrylate, cyclohexyl acrylate, (2-ethylhexyl)acrylate, (ε-caprolactone)acrylate, (2-hydroxypropyl)acrylate, (3-hydroxypropyl)acrylate, (4-hydroxybutyl)acrylate and (2-hydroxybutyl)acrylate; those in which the above-described acrylic ester is changed into methacrylic ester such as methacrylic ester; and unsaturated acid such as acrylic acid, methacrylic acid, maleic acid anhydride, crotonic acid and itaconic acid.

There is no particular restriction to Yb, as long as it is an ethylenic unsaturated monomer copolymerizable with Yb. The preferred examples of the vinyl ester include vinyl acetate, vinyl propionate, vinyl butyrate, vinyl valerate, vinyl pivalate, vinyl caproate, vinyl capriate, vinyl laurate, vinyl myristate, vinyl palmitate, vinyl stearate, vinyl cyclohexane carboxylate, vinyl octylate, vinyl methacrylate, vinyl crotonate, vinyl sorbate and vinyl cinnamate. Yb may be plural monomers.

Control of molecular weight is difficult in synthesizing such polymers X and Y, and it is preferable to employ a method by which polymer having a molecular weight of not so high and as uniform as possible is obtained.

The following methods can be cited as such the method of polymerizing polymers X and Y, method using a peroxide compound such as cumene peroxide and t-butyl hydroperoxide as the polymerization initiator, a method using a chain-transfer agent such as a mercapto compound or carbon tetra chloride additionally to the polymerization initiator, a method using a polymerization terminator such as benzoquinone and nitrobenzene, and a method described in JP-A 2000-128911 or 2000-344823 in which bulk polymerization is performed by using a polymerization catalyser such as a compound having one thiol group and a secondary hydroxyl group or a combination of such the compound and an organic metal compound is used as a polymerization catalyst.

Polymer Y is preferably polymerized by a method in which a compound having one thiol group and a secondary hydroxyl group is used as a chain transfer agent. The polymer Y has a hydroxy group and a thioether group at polymer terminal resulted from the polymerization catalyser and chain transfer agent in this case. Solubility of the polymer Y with the cellulose ester can be controlled by the terminal residues.

The hydroxyl value of polymer X and Y is preferably 30 to 150 mg KOH/g.

(Measurement of Hydroxyl Value)

The measurement of the hydroxyl value is based on JIS K 0070 (1992). This hydroxyl value is defined as mg number of potassium hydroxide which is required to neutralize acetic acid bonding to a hydroxyl group when 1 g of a sample is acetylated.

Practically, X g (approximately 1 g) of a sample is precisely weighed in a flask, which is added with exactly 20 ml of an acetylation agent (20 ml of acetic acid anhydride is added with pyridine to make 400 ml). The flask is equipped with an air condenser at the mouth and heated in a glycerin bath of 95 to 100° C. After 1 hour and 30 minutes, the system is cooled and added with 1 ml of purified water through the air condenser to decompose acetic acid anhydride into acetic acid.

Next titration with a 0.5 mol/L ethanol solution of potassium hydroxide was performed by use of a potentiometric titration apparatus to determine the inflection point of the obtained titration curve as an end point.

Further, as a blank test, titration without a sample is performed to determine the inflection point of a titration curve. A Hydroxyl value is calculated by the following Formula.

$$\text{Hydroxyl value} = \{(B-C) \times f \times 28.05/X\} + D$$

In the Formula, B is quantity (ml) of a 0.5 mol/L ethanol solution of potassium hydroxide utilized for a blank test, C is quantity (ml) of a 0.5 mol/L ethanol solution of potassium hydroxide utilized for titration, f is a factor of a 0.5 mol/L ethanol solution of potassium hydroxide, D is an acid value, and 28.05 is ½ of molar quantity 56.11 of potassium hydroxide.

The polymer X and polymer Y described above are both excellent in solubility with cellulose ester, productivity with minimized evaporation or volatilization, retention as the optical film, and dimensional stability with minimized moisture permeability.

Content of the polymer X and polymer Y used in the invention is preferably 5 to 20% by mass. The polymer X and polymer Y works sufficiently to adjust retardation value when it is 5% by mass or more as the total amount in the total mass of the cellulose ester. Adhesive property with polarizer PVA is good when it is 20% by mass or less as the total amount.

The polymer X and polymer Y can be added directly to cellulose ester as the melt component.

(Other Additive)

It is preferable to incorporate additives such as a plasticizer to improve processability to the film, an anti-oxidant to inhibit deterioration of the film, a UV absorbing agent to give UV absorbing function, micro particle (a matting agent) to give slipping property to the film, and a retardation adjusting agent to adjust the retardation, in the cellulose ester resin layer (A) of the invention.

(Plasticizer)

Plasticizers include an alcoholic compound, phosphoric acid ester plasticizer, ethyleneglycol ester plasticizer, glycerin ester plasticizer, diglycerin ester plasticizer (fatty ester), polyalcohol ester plasticizer, dicarboxylic acid ester plasticizer, polycarboxylic acid ester plasticizer, polymer plasticizer and the like.

An amount to add is preferably 1 to 50% by mass with respect to 100 parts by mass, more preferably 3 to 30% by mass, and particularly preferably 5 to 15% by mass with respect to 100 parts by mass of cellulose ester.

(Alcohol Compound)

Mono-valent to poly-valent alcohol compounds may be used in the invention.

Practically listed are a mono-valent alcohol such as butyl alcohol, (iso- or n-)amyl alcohol, hexyl alcohol, heptyl alcohol, 1-octanol, 2-ethylhexyl alcohol, n-dodecyl alcohol, lauryl alcohol and oleyl alcohol; a divalent alcohol such as 1,5-pentane diol, ethylene glycol, propylene glycol, 2-methyl-2,4-pentane diol, and 1,6-hexane diol; trivalent alcohol such as trimethylol propane, trimethylol ethane, glycerin and phytan triol; tetra-valent alcohol such as pentaerythritol and diglycerin; and a polyalcohol such as polyglycerin.

Among these a mono valent alcohol having seven or more carbon atoms is preferably. It is further preferable to have a boiling point of 160° C. or higher.

Anti-bleed out property becomes deteriorate as it is water soluble. Preferable alcohol compounds to obtain the advantage of the invention include heptyl alcohol, 1-octanol, 2-ethylhexyl alcohol, n-dodecyl alcohol, lauryl alcohol oleyl alcohol and the like among them.

The plasticizers preferably used in the invention are further described. The practical examples are not limited to these.

(Phosphoric Acid Ester Based Plasticizer)

Specific examples of the phosphoric acid ester based plasticizer include a phosphate alkyl ester such as triacetyl phosphate and tributyl phosphate; a phosphate cycloalkyl ester such as tricyclopentyl phosphate, cyclohexyl phosphate; and a phosphate aryl ester such as triphenyl phosphate, tricresyl phosphate, cresyl phenyl phosphate, octyl diphenyl phosphate, diphenylbiphenyl phosphate, trioctyl phosphate, tributyl phosphate, trinaphthyl phosphate, trixylylphosphate and tris-ortho-biphenyl phosphate.

The substituents may be same or different and may be substituted further. They include a mixture of an alkyl group, a cycloalkyl group and an aryl group, and further the substituents may be bonded via covalent bond.

(Ethylene Glycol Ester Based Plasticizer)

Specific examples of the ethylene glycol ester based plasticizer include an ethylene glycol alkyl ester based plasticizer such as ethylene glycol diacetate and ethylene glycol dibutylate; an ethylene glycol cycloalkyl ester based plasticizer such as ethylene glycol dicyclopropyl carboxylate, and ethylene glycol dicyclohexyl carboxylate; an ethylene glycol aryl ester based plasticizer such as ethylene glycol dibenzoate, and ethylene glycol di-4-methylbenzoate.

(Glycerin Ester Based Plasticizer)

Specific examples of the glycerin ester based plasticizer include glycerin alkyl ester such as triacetin, tributyrin, glycerin diacetate caprylate and glycerin oleate propionate; glycerin cycloalkyl ester such as glycerin tricyclopropyl carboxylate and glycerin tricyclohexyl carboxylate; diglycerin aryl ester such as glycerin tribenzoate and glycerin 4-methylbenzoate; diglycerin alkyl ester such as diglycerin tetraacetylate, diglycerin tetrapropionate, diglycerin acetate tricaprylate and diglycerin tetralaurate; diglycerin cycloalkyl ester such as diglycerin tetracyclobutyl carboxylate and diglycerin tetracyclopentyl carboxylate; and diglycerin aryl ester such as diglycerin tetrabenzoate and diglycerin 3-methylbenzoate.

(Polyalcohol Ester Based Plasticizer)

Practically cited are those described in paragraphs 30 to 33 of JP-A 2003-12823.

(Dicarboxylic Acid Ester Based Plasticizer)

Specific examples of the dicarboxylic acid ester based plasticizer include an alkyldicarboxylic acid alkyl ester based plasticizer such as didodecyl malonate (C1), dioctyl adipate (C4) and dibutyl sebacate (C8); an alkyldicarboxylic acid cycloalkyl ester based plasticizer such as dicyclopentyl succinate and dicyclohexyl adipate; an alkyldicarboxylic acid aryl ester based plasticizer such as diphenyl succinate and di(4-methylphenyl)glutarate; a cycloalkyl dicarboxylic acid alkyl ester based plasticizer such as dihexyl-1,4-cyclohexane dicarboxylate and didecyl bicyclo[2.2.1]heptane-2,3-dicarboxylate; a cycloalkyl dicarboxylic acid cycloalkyl ester based plasticizer such as dicyclohexyl-1,2-cyclobutane dicarboxylate and dicyclopropyl-1,2-cyclohexyl dicarboxylate; a cycloalkyl dicarboxylic acid aryl ester based plasticizer such as diphenyl-1,1-cyclopropyl dicarboxylate and di-2-naphthyl-1,4-cyclohexane dicarboxylate; an arylcarboxylic acid alkyl ester based plasticizer such as diethyl phthalate, dimethyl phthalate, dioctyl phthalate, dibutyl phthalate and di-2-ethylhexyl phthalate; an aryldicarboxylic acid cycloalkyl ester based plasticizer such as dicyclopropyl phthalate and dicyclohexyl phthalate; and an aryldicarboxylic acid aryl ester based plasticizer such as diphenyl phthalate and di-4-methylphenyl phthalate.

(Polyvalent-Carboxylate Based Plasticizer)

In concrete, this type of plasticizer includes an alkyl alkylpolycarboxylate based plasticizer such as tridodecyl tricarbalate and tributyl meso-butane-1,2,3,4-tetre carboxylate; a cycloalkyl alkylpolycarboxylate based plasticizer such as tricyclohexyl tricarbalate and tricyclopropyl 2-hydroxy-1,2,3-propane-tricarboxylate; an aryl alkylpolycarboxylate based plasticizer such as triphenyl 2-hydroxy-1,2,3-propanetricarboxylate and tetra-3-methylphenyl tetrahydrofuran-2,3,4,5-tetracarboxylate; an alkyl cycloalkyl polycarboxylate based plasticizer such as tetrahexyl-1,2,3,4-cyclobutane-tetracarboxylate and tetrabutyl 1,2,3,4-cyclopentane-tetracarboxylate; a cycloalkyl polycarboxylate based plasticizer such as tetracyclopropyl-1,2,3,4-cyclobutane-tetracarboxylate and tricyclohexyl-1,3,5-cyclohexyl-tricarboxylate; an aryl cycloalkyl polycarboxylate based plasticizer such as triphenyl-1,3,5-cyclohexyl-tricarboxylate and hexa-4-methylphenyl-1,2,3,4,5,6-cyclohexylhexacarboxylate; an alkyl arylpolycarboxylate based plasticizer such as tridodecyl benzene-1,2,4-tricarboxylate and tetraoctyl benzene-1,2,4,5-tetracarboxylate; a cycloalkyl arylpolycarboxylate based plasticizer such as tricyclopentyl benzene-1,3,5-tricarboxylate and tetracyclohexyl benzene-1,2,3,5-tetracarboxylate; and an aryl arylpolycarboxylate based plasticizer such as triphenyl benzene-1,3,5-tetracarboxylate and hexa-4-methylphenyl benzene 1,2,3,4,5,6-hexacarboxylate.

(Polymer Plasticizer)

The cellulose ester film of the invention may use a polymer plasticizer.

In particular, polyesters described in paragraphs of 0103 to 0116 of JP-A 2007-231157, and the polyester plasticizers described above can be preferably used.

(Sugar Ester Plasticizer)

The cellulose ester film of the invention preferably uses a sugar ester plasticizer which is obtained by esterifying the hydroxyl groups of a sugar compound in which 1 to 12 units of at least one of a furanose structure or a pyranose structure are bonded.

Examples of a sugar ester compound employed in the invention include glucose, galactose, mannose, fructose, xylose, arabinose, lactose, sucrose, cellobiose, cellotriose, maltotriose and raffinose. Specifically preferable is a compound having both a furanose structure and a pyranose structure, such as sucrose.

MONOPET SB, manufactured by Dai-Ichi Kogyo Seiyaku Co., Ltd., is available in the market.

It is preferable that the plasticizers described above do not generate a volatile component during heat melting. Practical example includes non-volatile phosphate based and preferably arylen bis(diarylphosphate) ester and trimethylolpropane benzoate among the exemplified compound above, but is not limited to these.

The thermal decomposition temperature Td (1.0) of the plasticizer mentioned above is preferably higher than the melt temperature of the film material, wherein it is defined by the temperature at which mass is reduced by 1.0% by mass, when the volatile component is generated by thermal decomposition of the plasticizer mentioned above. The thermal decomposition temperature Td (1.0) can be measured by a differential thermogravimetric analysis (TG-DTA) apparatus obtained from the market.

(Anti-Oxidation Agent)

Conventionally known anti-oxidation agent can be used in the invention.

Preferably employed are lactone based, sulfur based, phenol based, double bond compound based, hindered amine based, and phosphor based.

Preferably examples are those containing chemicals named "IRGAFOS XP40" and "IRGAFOS XP60" in the market from Ciba Japan Inc.

The phenol compounds described above is preferably those having 2,6-dialkyl phenol and is listed are commercially available as "IRGANOX 1076" and "I IRGANOX 1010" manufactured by Ciba Japan Inc. and "ADK STAB AO-50" from ADEKA Corp.

Examples of above-mentioned commercially available phosphorus-containing compounds include: "SUMILIZER GP" from Sumitomo Chemical Co., Ltd.; "ADK STAB PEP-24", "ADK STAB PEP-36" and "ADK STAB 3010" from ADEKA Corp.; "IRGAFOS P-EPQ" from Ciba Specialty Chemicals, Inc.; and GSY-P101 from SAKAI CHEMICAL INDUSTRY CO., LTD.

Hindered amine compounds of the above types are preferably those commercially available under trade names of, for example, "TINUVIN 144" and "TINUVIN 770" from Ciba Japan Inc., as well as under the trade names of "ADK STAB LA-52" from ADEKA Corp.

The above sulfur-containing compounds are preferably those commercially available under trade names of, for example, "SUMILIZER TPL-R" and "SUMILIZER TP-D" from Sumitomo Chemical Co., Ltd.

The above double bond compounds are preferably those commercially available under trade names of for example, "SUMILIZER GM" and "SUMILIZER GS" from Sumitomo Chemical Co., Ltd.

Acid capture compound may be incorporated, example of which is a compound having an epoxy group disclosed in U.S. Pat. No. 4,137,201.

An amount to addition of the compound of anti-oxidant etc. is determined optionally in accordance with the re-use process, and is usually added in the range of 0.05 to 20% by mass in general and preferably 0.1 to 1% by mass of the resin of the major material of the film.

A synergy effects can be obtained by using several anti-oxidants of different types in combination rather than singly used. It is preferable, for example, combination of the lactone type, phosphorus type, phenol type and double bond type.

(Coloring Agent)

It is preferable to use a coloring agent in the invention. The coloring agent includes a dye and a pigment, and in the invention includes those controlling LC display in bluish hue, adjusting yellow index and reducing haze.

Various dyes and pigments are available for the coloring agent, and an anthraquinone dye, an azo dye, a phthalocyanine pigment and the like are effective.

(UV Absorber)

Although the UV absorber used in the invention is not specifically limited, for example, an oxybenzophenone type compound, a benzotriazole type compound, a salicylate type compound, a benzophenone type compound, a cyanoacrylate type compound, a triazine type compound, a nickel complex salt type compound or inorganic powder may be cited. A polymer UV absorber is also applicable. The benzotriazole type compound mentioned above is preferably one commercialized in a trade name of "TINUVIN 928" from Ciba Japan Inc.

(Matting Agent)

It is preferable to add a matting agent to endow slipping property to the film.

Either of an inorganic compound or an organic compound is usable as a matting agent in the present invention as far as the transparency of the obtained film is not deteriorated or the matting agent is heat resistant in the melting process. Examples of a matting agent include talc, mica, zeolite, diatomaceous earth, calcinated diatomaceous earth, kaolin, sericite, bentonite, smectites, clay, silica, quartz powder, glass beads, glass powder, glass flake, milled fiber, wollastonite, boron nitride, boron carbide, boron titanate, magnesium carbonate, heavy calcium carbonate, light calcium carbonate, calcium silicate, aluminum silicate, magnesium silicate, magnesium aluminosilicate, alumina, zinc oxide, titanium dioxide, iron oxide, magnesium oxide, zirconium oxide, aluminum hydroxide, calcium hydroxide, magnesium hydroxide, calcium sulfate, barium sulfate, silicon carbide, aluminum carbide, titanium carbide, aluminum nitride, silicon nitride, titanium nitride and white carbon. These matting agents may be utilized alone or in combination of at least two types.

Transparency and a lubricating property can be highly balanced by utilizing particles having different particle diameters and forms (for example, a needle form and a spherical form) in combination.

Silicon dioxide is preferably used among these since it has closed refractive index to cellulose ester and exhibits good transparency or haze in particular.

As specific examples of silicon dioxide, preferably utilized can be products available on the market under the name of such as AEROSIL 200V, R972V, R972, R974, R812, 200, 300, R202, OX50 and TT600, AEROSIL RY50, AEROSIL NY50, AEROSIL RY200, AEROSIL RY200S, AEROSIL RX50, AEROSIL NA50, AEROSIL RX200, AEROSIL RX300, AEROSIL R504, AEROSIL DT4, AEROSIL LE1, AEROSIL LE2, (manufactured by Nippon AEROSIL Co., Ltd.), SEAHOSTAR KEP-10, KEP-30 and KEP-50 (manufactured by Nippon Shokubai Co., Ltd.), SYLOPHOBIC 100 (manufactured by Fuji Silysia Chemical Ltd.), NIPSEAL E220A (manufactured by Nippon Silica Industry) and ADMAFINE SO (manufactured by Admatechs Co., Ltd.).

As for a form of particles, any of an irregular form, a needle form, a flat form and a spherical form can be utilized without specific limitation; however, a spherical form is specifically preferable because transparency of the prepared film becomes excellent.

The size of particles is preferably not more than a wavelength of visible light and more preferably not more than ½ of a wavelength of visible light because light will be scattered when the size is near to a wavelength of visible light to make transparency poor. The particle size is specifically preferably in a range of 80 to 180 nm since a sliding property may not be improved when the size is excessively small. Herein, the particle size means the size of aggregate when the particles are constituted of aggregate of primary particles.

The particle size means a diameter of an equivalent circle of the projected area when particles are not spherical.

(Viscosity Reducing Agent)

There may be added a hydrogen bonding solvent to reduce melt viscosity In the present invention. The hydrogen bonding solvent refers to an organic solvent capable of forming a hydrogen atom-mediated "bond" caused between an electrically negative atom (e.g., oxygen, nitrogen, fluorine, chlorine) and a hydrogen atom covalent-bonded to the electrically negative atom, in other word, it means an organic solvent capable of arranging molecules approaching to each other with a large bonding moment and by containing a bond including hydrogen such as O—H ((oxygen hydrogen bond), N—H (nitrogen hydrogen bond) and F—H (fluorine hydrogen bond), as described in J. N. Israelachibiri, "Intermolecular Force and Surface Force" (translated by Tamotsu Kondou and Hiroyuki Ooshima, published by McGraw-Hill. 1991).

The hydrogen bonding solvent is capable of forming a hydrogen bond between celluloses stronger than that between molecules of cellulose resin, the melting temperature of a cellulose resin composition can be lowered by the addition of the hydrogen bonding solvent than the glass transition temperature of a cellulose resin alone in the melt casting method conducted in the present invention. Further, the melt viscosity of a cellulose resin composition containing the hydrogen bonding solvent can be lowered than that of a cellulose resin in the same melting temperature.

The method for producing an optical film of the invention is, as describe in claim 1, a method for producing an optical film by laminating a cellulose ester resin layer (A) and an acrylic resin layer (B) via coextrusion of a melted composition of a cellulose ester resin and a melted composition of an acrylic resin, and forming a web by coextrusion, and when the coextruded web is conveyed while cooling by a first cooling roll and a second cooling roll arranged subsequent to the first cooling roll, the coextruded web is conveyed while the cellulose ester resin layer (A) being made contact with a surface of the first cooling roll, and the acrylic resin layer (B) being made contact with a surface of the second cooling roll, which is characterized in that Ta (° C.) and Tb (° C.) satisfy the following relationship 1, wherein Ta (° C.) is a surface temperature of the first cooling roll, and Tb (° C.) is a surface temperature of the second cooling roll, $$(Ta-80)° C. < Tb(° C.) < (Ta-5)° C. \qquad \text{Relationship 1}$$

In case that Tb (° C.) is not higher than (Ta−80)° C., temperature difference between the first cooling roll and the second cooling roll is large, difference of contraction and expansion of the cellulose ester resin and acrylic resin due to temperature is apt to occur, wrinkle, undulation, light leakage are apt to generate. It is not preferable because the expansion of film is found and the film is apt to cause a deformation in case that Tb (° C.) is not lower than (Ta−5)° C. Preferable range of the relation 1 is (Ta−70)° C.<Tb (° C.)<(Ta−20)° C.

It is preferable for the purpose of obtaining an optical film having no partial light leakage or undulation, which is the advantage of the invention, that the resin of the cellulose ester resin layer (A) has tan δa at a surface temperature of the first cooling roll Ta (° C.) satisfying $0.1 \leq \tan \delta a \leq 0.5$, wherein tan δa is a value of tan obtained by measuring dynamic viscoelasticity of a film formed by melt extrusion of melted composition of resin in the cellulose ester resin layer (A) in a single layer, measured in a range from 0° C. to 120° C. at measuring frequency of 1 Hz, and the resin of the cellulose ester resin layer (B) has tan δb at a surface temperature of the second cooling roll Tb (° C.) satisfying $0.05 \leq \tan \delta b \leq 0.2$, wherein tan δb is a value of tan δ obtained by measuring dynamic viscoelasticity of a film formed by melt extrusion of melted composition of resin in the acrylic resin layer (A) in a single layer, measured in a range from 0° C. to 120° C. at measuring frequency of 1 Hz.

The tan δa and tan δb can be controlled by selecting the structure as itself or weight average molecular weight of cellulose ester resin and acrylic resin, content ratio of the cellulose ester resin to acrylic resin in the melted composition, temperature of first cooling roll and second cooling roll Ta (° C.) and Tb (° C.), respectively, kinds or content ratio of the additive in the melted composition, such as plasticizer, viscosity reducing agent, as described above, and, it is preferable to control by selecting the structure as itself or weight average molecular weight of the cellulose ester resin and the acrylic resin, content ratio of the cellulose ester resin to acrylic resin in the melted composition, temperature of first cooling roll and second cooling roll Ta (° C.) and Tb (° C.), respectively, in the invention.

For measuring the dynamic viscoelasticity, film formed by melt extrusion of the melted composition employing the above described resin in a single layer is cut into disk shape having a diameter of 1 cm, tan δa at the surface temperature of the first cooling roll Ta (° C.), and tan δb at the surface temperature of the second cooling roll Tb (° C.) are obtained by viscosity change curve obtained by measuring dynamic viscoelasticity at temperature rising rate of 5° C./min, in a temperature range of 0° C. to 120° C. Dynamic viscoelasticity measuring apparatus RSA III (product of TA Instrument) was employed in measuring the dynamic viscoelasticity. Measuring frequency is 1 Hz.

The object of the invention can be attained by controlling the structure as itself or weight average molecular weight of the cellulose ester resin and the acrylic resin, content ratio of the cellulose ester resin to acrylic resin in the melted composition, so that the cellulose ester resin layer (A) satisfies $0.1 \leq \tan \delta a \leq 0.5$ at a surface temperature of the first cooling roll Ta (° C.) and the cellulose ester resin layer (B) satisfies $0.05 \leq \tan \delta b \leq 0.2$ at a surface temperature of the second cooling roll Tb (° C.).

The optical film of the invention can be obtained by arranging a layer (B) the containing 55 to 95% by mass of acrylic resin on one side of the cellulose ester resin layer (A) containing 55 to 95% by mass of cellulose ester resin, and the layers (A) and (B) are extruded from a flat die to a film shape in a state of two or more layers being laminated.

The layers composing the optical film of the invention may be laminated in any layers of two or more, however two-layer composition is generally preferable in view of complicating the production equipment and the like. The term lamination means that two or more melt resins having fluidity are made to join and produce a single body sheet film.

A melt extrusion method by heat melt can be classified, in further details, into such as a melt extrusion molding method, a press molding method, an inflation molding method, an ejection molding method, a blow molding method and a stretching molding method, and, among these methods, to prepare film being excellent in such as mechanical strength and surface precision, preferable is an extrusion molding method, which is used in particular in the invention. The temperature of melt resin is preferably in a range of 120 to 300° C., and more preferably in a range of 200 to 270° C., in view of the physical property of the obtained optical film. The cylinder temperature is appropriately set generally in a range of 150 to 400° C., preferably of 200 to 350° C. and more preferably of 230 to 330° C. There is a possibility of causing molding defects such as a shrink mark or distortion in film due to deteriorated fluidity when the resin temperature is excessively low, while voids or silver streaks or yellowing of film may be generated when the resin temperature is excessively high.

In an actual flow a raw material cellulose ester formed into powders or pellets is subjected to hot air drying or vacuum drying, and then is heated and melted together with film constituent materials to express fluidity. Thereafter, the resulting melted mixture is extruded into a sheet through a T-die, and is brought into close contact with a cooling drum or an endless belt, for example, using an electrostatic application method for cooling-solidification to obtain an unstretched sheet. The temperature of the cooling drum is preferably kept at 90 to 150° C.

FIG. 1 is an outline flow sheet showing the whole constitution of an apparatus practicing the production method of the cellulose ester film of the invention, and FIG. 2 is an enlarged view from a die to cooling roll part.

The production method of the optical film of the invention is shown in FIGS. 1 and 2, in which after blending film raw materials such as a cellulose ester resin and an acrylic resin, they are melt extruded on the first cooling roll 5 from die 4 by employing extruder 1. The cellulose ester resin layer (A) is brought into contact with the surface of first cooling roll 5, and, the acrylic resin layer (B) is brought into contact with surface of second cooling roll 7, then the film is conveyed to the third cooling roll 8 (if necessary), thus it is brought into contact with three cooling rollers in sequence to cool and solidify and to obtain cellulose ester film 10. Cellulose ester film 10 taken off by take off roll 9 is subjected to stretching by gripping both sides of the film employing stretching device 12, and is wound by winding device 16. Elastic touch roll 6 is provided for leveling flatness so that molten film is brought into contact with pressure to surface of first cooling roll 5. Elastic touch roll 6 has elasticity in its surface, and forms a nip between first cooling roll 5. Elastic touch roll 6 will be detailed later.

Figure 2A:
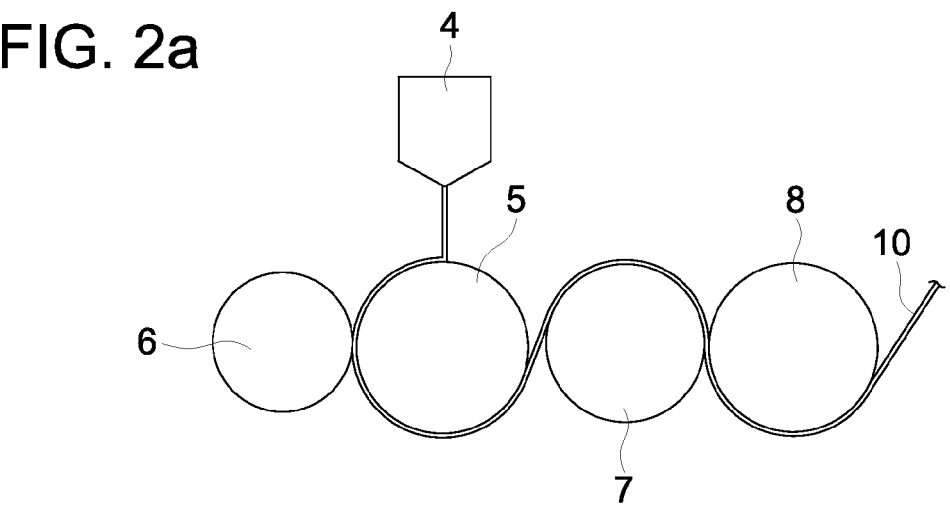
FIG. 2 is an enlarged view from a die to cooling roll part.
Figure 2B:
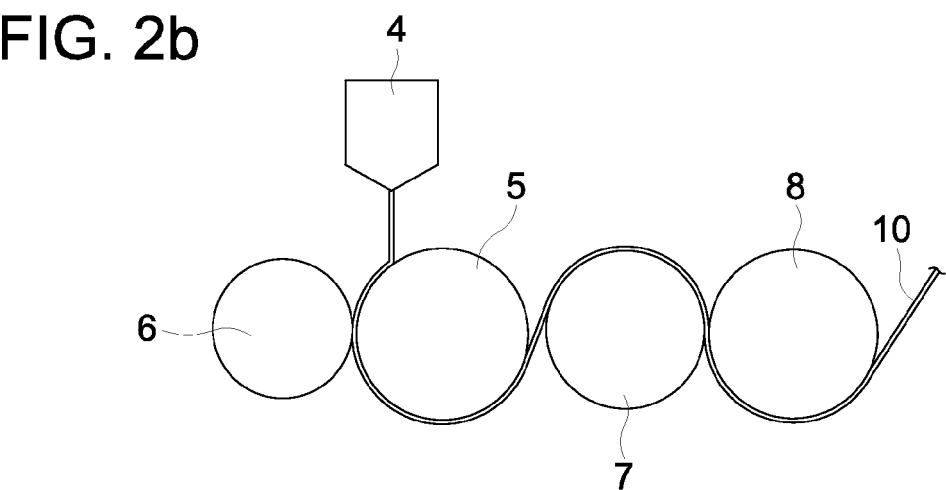
Figure 2C:
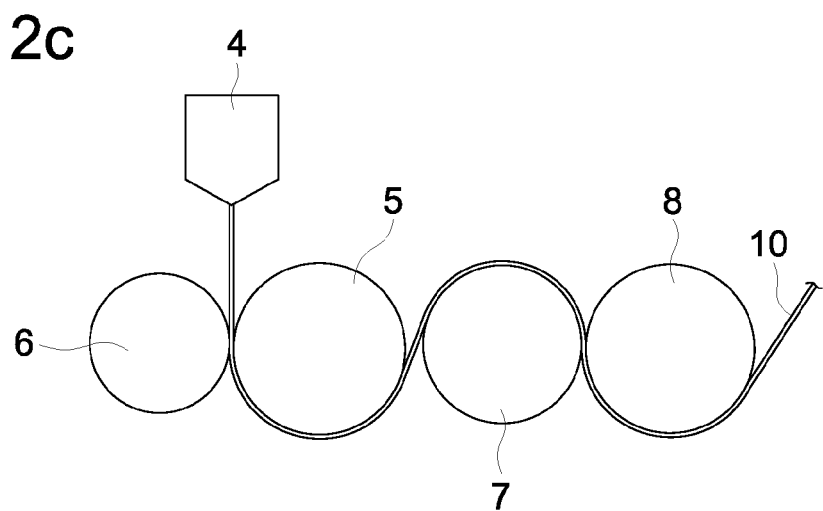

Extrusion from the die to cooling roll may be exemplified as FIGS. 2a, 2b and 2c, as its position, but is not particularly limited.

Figure 3:
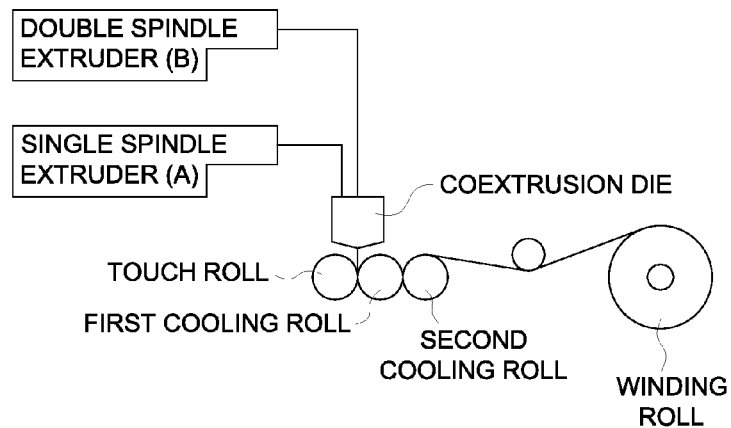
FIG. 3 is outline view of coextrusion die molten film forming apparatus preferably used in the invention.

FIG. 3 is outline view of coextrusion die molten film forming apparatus preferably used in the invention.

Acrylic resin formed into powders or pellets is molt and kneaded via single spindle extruder (A), and cellulose ester resin is molt and kneaded via double spindle extruder (B). It is preferable to use a double spindle extruder to knead homogeneously additives such as plasticizer and anti-oxidant which are incorporated in cellulose ester. The double spindle extruder has high effect to blend materials since stronger sharing force is acted by two screws than a single spindle extruder. Double spindle extruder includes two types, one is the same direction rotation type and the other is counter direction rotation type, and the former is preferably used in the invention because stronger shearing force is given. Further segments such as feeding of screw and kneading can be designed in optimal combination so as to melt and knead materials of the invention. For example, a kneading disk is installed to disperse a material hard to disperse such as inorganic microparticle matting agent into desired dispersion degree, and diameter of a screw is selected to obtain desirable extrusion amount. Raw materials may be supplied to separately or blended previously, when the materials are supplied to a same direction rotating double spindle extruder. Known continuous feeder such as a screw feeder, an electromagnetic vibration feeder and forced pressure screw feeder may be used to supply the raw material to the extruder. It is preferable to dry cellulose ester and acrylic resin prior to supplying to the extruder, and the drying temperature is preferably not higher than the Tg of the resin. It is not preferable that glass transition temperature or melting point of the additives such as a plasticizer is lower than the drying temperature of the cellulose ester resin and the acrylic resin, since the additives may be fused on wall when it is dried together with. It is preferable the additive is dried and supplied separately from cellulose ester resin and acrylic resin in such instance. Drying temperature is set as not higher than the lowest Tg or melting point among the materials when cellulose ester resin, acrylic resin and additives are supplied previously mixed. It is preferable to supply promptly the dried material to the extruder avoid moisture absorption. The drier is arranged to set at the upper portion of the extruder so as to supply the dried material promptly to the extruder by continuous feeder described above for this purpose. Further, it is preferable to used vacuum drying, reduced pressure drying, and drying introducing inactive gas to dry efficiently and avoid moisture absorption by dried material. It is also preferable that the space between the dryer and feeder, and feeder and inlet of the extruder is subjected to reducing pressure or inactive gas ambient. In case that cellulose and additives are supplied in powder shape, it is preferable that particle size and particle size distribution are the same or close for the homogeneous blending. It is also preferable to pulverize the mixed materials by a pulverizer.

Defective material of the melt molded film or edge portion not suitable for mold product (which is called as recycle material) can be used for molding raw material after pulverized. The recycle material can be made pellet or granulated. The recycle material may be made pellet or granulated solely or together with a fresh material. The recycle material may be supplied to the extruder separated from the fresh material, and the cellulose ester resin, acrylic resin and the recycle material may be supplied by mixture.

Then, respective melt resin flows are laminated by a merging device called feed block, or spread resin flows by a manifold are merged and laminated by a mouthpiece land portion, they are melt extruded from coextrusion die (a flat die in the invention) to form a two layer laminate sheet arranging cellulose ester containing layer (A) and acrylic resin containing layer (B). The melt resin laminated sheet is brought into contact closely with a moving cooler medium such as a take off roll shown in the drawing so as to cool and solidify, and the cast sheet is obtained.

Initially prepared pellets heated to extrusion melt temperature of around 200 to 300° C. by the single or double spindle extruder as described above, foreign matter is removed by filtration using leaf disk type filter or the like, the molt material is coextruded from T die in a film shape, is solidified on the cooling roller, and is subject to extruding in contact with a elastic touch roll with forced pressure.

It is preferable to prevent oxidation decomposition by introducing from supplying hopper to extruder in ambience of vacuum, reduced pressure or inactive gas.

There may be an instance to generate defects in line shape when the die has flaws or foreign matter such as coagulated substance of plasticizer is adhered to the die. The defects are called as die line. It is preferable that piping from extruder to die has a structure with minimized retention portion of the resin. It is preferable to use a die having flaws inside or at lip as few as possible.

The inside surface of an extruder or a die which contacts with melt resin is preferably subjected to a surface treatment to be made barely adhere melt resin by decreasing the surface roughness or by utilizing a material having a low surface energy. Specifically, listed are those having been subjected to hard chromium plating or ceramic melt spattering are ground to make a surface roughness of not more than 0.2 S.

The first cooling roll, the second cooling roll (and the third cooling roll if necessary) in the invention are not particularly limited. The rolls are made of high rigid metal and have structure to allow heat medium or cool medium to control temperature flows in their inside. The size is not limited, but is sufficient to cool the melt extruded film, and the diameter of the cooling roll is generally 100 mm to 1 m.

Surface substance of the cooling roll is carbon steel, stainless steel, aluminum titanium and the like. It is preferable to process of surface treatment such as hard chrome plating, nickel plating, amorphous chrome plating or ceramic so as to enhance the hardness of the surface or improving releasing performance from resin.

Surface roughness of the cooling roller is preferably not more than 0.1 µm in terms of Ra and more preferably not more than 0.05 µm. The smoother the roll surface is, the smoother the surface of the obtained roll becomes. It is preferable to polish the surface treated roll to have roughness as above described.

An elastic touch roll, arranged counter to the first cool roll can be rolls silicon rubber roll surface thereof is covered with thin metal sleeve, described in such as JP-A H03-124425, H08-224772, H07-100960, H10-272676, WO 97-028950, H11-235747, 2002-36332, 2005-172940, and 2005-280217.

It is preferable to prevent deformation of film by control tension when the film is taken from the cooling roll.

Figure 4:
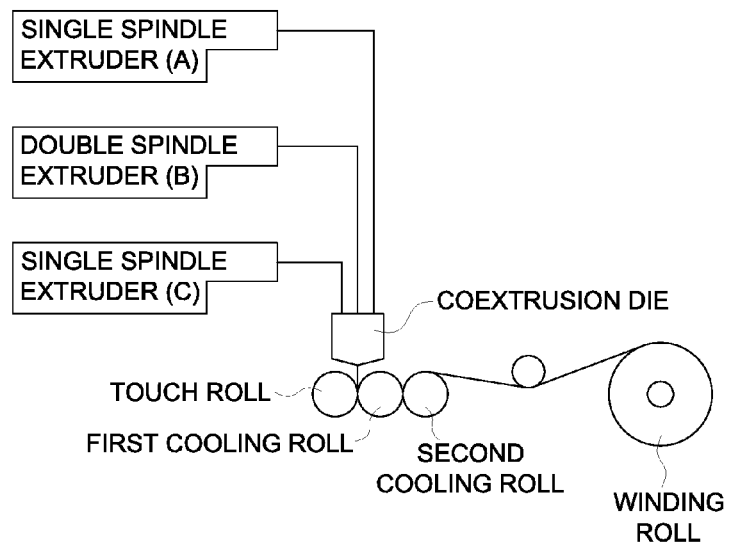
FIG. 4 shows another coextrusion die molten film forming apparatus preferably used in the invention.

FIG. 4 shows outline of another coextrusion die molten film forming apparatus preferably used in the invention.

Three layer sheets can be manufactured in such a manner wherein two extruders of a single spindle extruder for kneading cellulose ester resin (A) or acrylic resin (B) and a double spindle extruder (B) are used to supply separately before coextrusion die in this case.

Figure 5:
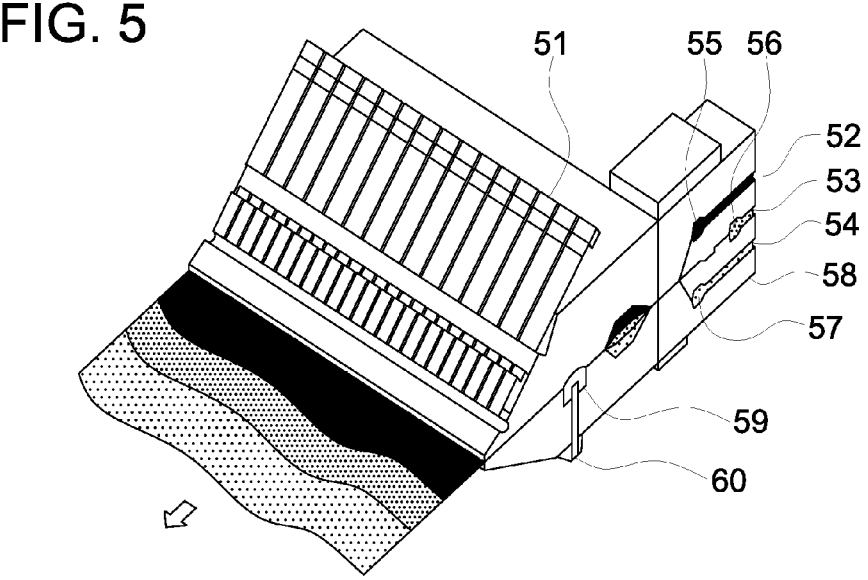
FIG. 5 is a schematic view of a die having feed block.

Coextrusion die used in the melt extrusion is preferably flat die such as T type die, L type die and fish tail type die, and whose die lip distance is preferably 50 µm to 2 mm. The coextrusion die may be any one of a die having feed block shown in FIG. 5, a manifold die shown in FIG. 6, and a multi-slot die, and multi-manifold die is particularly preferable in view of thickness precision and flatness. A multi-layer film having such as 5 layers or 7 layers can be formed by combining the feed block with the multi-manifold die. In this case an optical film having multi-layer construction composed of cellulose ester resin or acrylic resin mixed in arbitral varied ratio.

Figure 6:
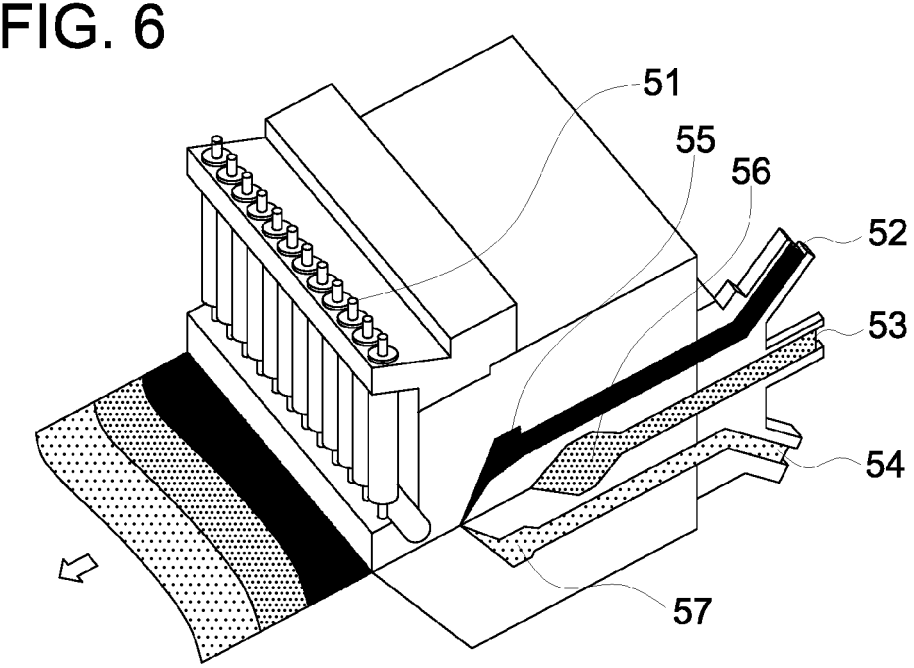
FIG. 6 is a schematic view of a multi-manifold die.

In the multi-manifold die shown in FIG. 6, which is preferable flat die in the invention, a cellulose ester resin or an acrylic resin molt and kneaded by a single spindle extruder or a double spindle extruder is introduced into extrude portion A and B via a gear pump (not shown), extrusion amount is stabilized by liquid reservoirs, i.e., manifold A and B, and is melt extruded to form a film with controlled film thickness by lip adjust bolts 51.

With reference to material of a flat die, ceramic material such as TiN or SUS material having excellent releasing ability is preferable for a material contacting to molt resin surface is preferably used rather than usual chromium plating or nitriding steel, since molt resin is apt to be adhesive to metal material such as a die, it is apt to generate fixed streaks named die streak, and there is a fear not to utilized for optical purpose.

A web laminated in multiple layers is brought into contact with a cooling roll to cool and solidify. When the sheet slips on a drum in this instance, molecular orientation occurs whereby so called variation of retardation occurs. For avoiding this, casting to the web may be conducted by a method with improved close contact property selected from an air knife, air chamber, a press roll method, liquid paraffin coating method and static electricity application method.

Figure 7:
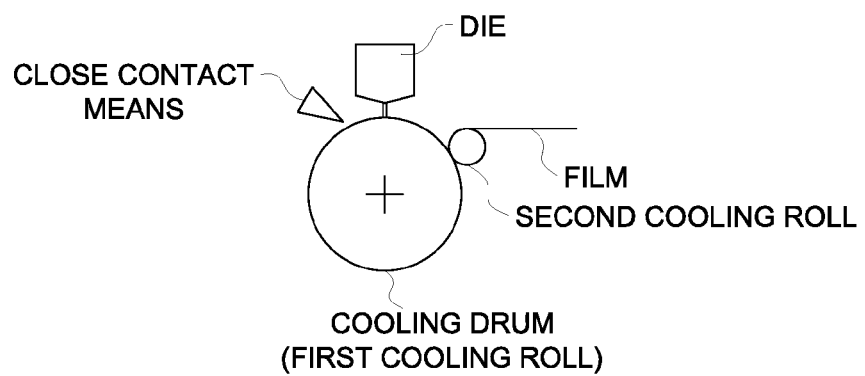
FIG. 7 shows another embodiment to take of the molten film.

FIG. 7 shows another embodiment to take off the molten film. Film composition supplied from a die is cooled and solidified in desired thickness by cooling drum, shown as first cooling roll and contacting means (an air knife or the like), and film is formed via take off roll, in this case.

Width of optical film by melt-film forming is preferably not less than 1.4 m and more preferably in the range of 1.4 to 3 m from a view point of productivity.

<Stretching Process>

It is preferable that the film obtained as described above is passed through a process to contact with a cooling roll, then is subjected to stretching 1.01 to 3.0 times in at least one direction. Keen streaks are relaxed via the stretching and can be highly leveled.

It is preferable to stretch 1.1 to 2.0 times in both of longitudinal (film conveying direction) and latitudinal (width direction).

It is preferable to use known roll stretching machine or tenter for stretching method. It is preferable to stretch width direction since the lamination to polarizing film can be conducted in roll shape, in case that the optical film works also as the polarizing plate protect film in particular.

The retardation axis of the optical film is width direction when the film is stretched in width direction.

Stretching factor is usually 1.1 to 3.0 times, and preferably 1.2 to 1.5 times, and stretching temperature is usually in the range of from glass transition temperature (Tg) to Tg+50° C., and preferably Tg to Tg+40° C.

It is preferable that the stretching is conducted under controlled uniform temperature distribution. The distribution range is preferable usually within ±2° C., more preferably within ±1° C., and practically preferably within ±0.5° C.

The optical film produced in the above described methods may be subjected to shrink in a longitudinal or width direction for the purpose of retardation adjustment or minimizing dimensional change.

There is a method to shrink in the longitudinal direction that stretching in width direction is once clip out to shrink in the longitudinal direction or distance between neighboring clips of the stretching machine in width direction is made narrower gradually to shrink the film.

The optical film of the invention is can be adjusted to have in-plane retardation value (Ro) and retardation value in thickness direction (Rth) optionally. It is preferable that Ro is 0 to 200 nm and Rth is −150 to 400 nm. It is particularly suitable for a phase difference film for a VA type liquid crystal display that Ro is 0 to 100 nm and Rth is 70 to 400 nm.

Ro and Rth are respectively represented by $Ro=(Nx-Ny)\times d$ $Rth=\{(Nx+Ny)/2-Nz\}\times d$ wherein, Nx is index of refraction in the retardation axis direction, Ny is index of refraction in advance axis direction Nz is index of refraction in thickness direction, and d(nm) is film thickness of the film.

Retardation values (Ro) and (Rth) can be measured by employing a birefringence instrument, for example, KOBRA-21ADH (Oji Scientific Instruments) and in a condition of 23° C. and 55% RH, at wavelength of 590 nm.

The deviation of retardation is preferable as small as possible, and usually within the range of ±10 nm, preferably not more than ±5 nm, and more preferably not more than ±2 nm.

Uniformity of retardation axis direction is also significant, and an angle against film width direction is preferably in the range of −5 to +5°, and more preferably −1 to +1°.

The optical film of the invention preferably has a height from the bottom of valley to peak of the neighboring summit not less than 300 nm, and has no continuous streaks with inclination of 300 nm/mm or more in longitudinal direction.

Shapes of the streaks are measured by employing a surface roughness meter. Practically, they are measured by employing SV-3100S4 manufactured by Mitsutoyo Corp. in a way that profile curve is measured by scanning the film in width direction at a measuring rate of 1.0 mm/sec, with spatial resolution in z axis (thickness direction) of 0.001 μm, while applying measuring load of 0.75 mN to stylus (diamond needle) having tip shape of circular cone of 60°, and tip curvature radius of 2 μm.

Height of the streaks is read vertical distance (H) from the peak of summit to bottom of valley of the curve. Gradient of the streaks are obtained by reading lateral distance (L) from the peak of summit to bottom of valley, and dividing vertical distance (H) by lateral distance (L).

<Cleaning Device>

It is preferable to equip a cleaning device cleaning belts and rolls automatically to the production apparatus of the invention. There is no limitation in the cleaning device, and includes, for example, a method nipping a brush roll, a water absorbing roll, an adhesive roll and a wiping roll, an air blow method of blowing clean air, incineration device by laser, or combination thereof.

Great cleaning effects can be given by changing the belt line speed from roller line speed in a method of nipping a cleaning roll.

The optical film of the invention is preferably long continuous film, and is practically one having length of 100 to 5,000 m, and is provided usually in a roll shape. Width of the film is preferably 1.3 to 4 m, and more preferably 1.4 to 2 m.

Though a thickness of the optical film of the invention is not particularly limited, it is preferable that the total thickness of the cellulose ester resin layer (A) and acrylic resin layer (B) is 20 to 200 μm, more preferably 25 to 100 μm, and further preferably 30 to 80 μm, for used in the polarizing plate protection film.

<Curable Resin Layer (Hard Coat Layer)>

It is preferable that the optical film of the invention further comprises a curable resin layer. The curable resin layer displays improving effect to brittleness and particularly resistant to repeated flexing as well as surface hardness.

The curable resin layer of the invention may be a single layer or two or more layers according to the degree of usage. One to four layers are preferable in view of productivity. They may be provided on both surfaces of the film.

Index of refraction of a transparent resin composing the curable resin layer of the invention is preferably not less than 1.47, and more preferably 1.47 to 1.70.

The index of refraction can be adjusted within the range by optionally selecting species and content of the transparent resins. It is difficult to obtain a resin having high hardness when the index of refraction is less than 1.47, and unevenness of the film apt to be remarkable when the index of refraction is more than 1.70.

The index of refraction can be qualitatively evaluated by measuring directly by Abbe refractometer or by measuring spectral reflection spectrum or spectral ellipsometry at 23° C.

The curable resin is preferably a binder polymer having a saturated hydrocarbon chain or polyether chain as a backbone chain, and more preferably the binder polymer having a saturated hydrocarbon chain as a backbone chain.

A resin which is cured via irradiation of heat or an active ray can be used for the curable resin, and particularly preferable is a resin cured by crosslinking reaction via irradiation of an active ray such as ultraviolet ray and electron ray.

Practical example of the preferable curable resin includes a UV ray curable acrylate resin such as a UV ray curable urethane acrylate resin, a UV ray curable polyester acrylate resin, a UV ray curable epoxy acrylate resin, a UV ray curable polyol acrylate resin and a UV ray curable epoxy resin.

The UV ray curable acrylurethane type resin can be easily obtained by, in general, reacting a reaction product of polyester polyol with an isocyanate monomer or prepolymer 2-hydroxy-ethylacrylate, with an acrylate type monomer having a hydroxy group such as 2-hydroxy-ethylmethacrylate (the term represented by "acrylate" includes methacrylate) and 2-hydroxy-propylacrylate.

For example, those described in JP-A S59-151110 can be used. For example, a mixture of 100 parts of UNIDIC 17-806 (manufactured by Dainippon Ink And Chemicals, Inc.) and 1 part of Coronate L (manufactured by Nippon Polyurethane Industry Co., Ltd.) is preferably employed.

The UV ray curable polyesteracrylate resins include those prepared easily by reacting a polyesterpolyol with 2-hydroxyethylacrylate or 2-hydroxypropylacrylate, disclosed for example, in JP-A S59-151112.

Examples of the UV ray curable epoxyacrylate resin include those prepared by reacting an epoxyacrylate oligomer in the presence of a reactive diluting agent and a photoinitiator, disclosed for example, in JP-A H01-105738.

Examples of the UV ray curable polyol acrylate resin include trimethylolpropane triacrylate, ditrimethylolpropane tetraacrylate, pentaerythritol triacrylate, pentaerythritol tetraacrylate, dipentaerythritol hexaacrylate and alkyl-modified dipentaerythritol pentaacrylate.

The photo-polymerization initiators for the UV ray curable resins include benzoin or its derivative, or acetophenones, benzophenones, hydroxy benzophenones, Michler's ketone, α-amyloxime esters, thioxanthones or their derivatives. These photo-polymerization initiators may be used together with a photo-sensitizer. The above photo-polymerization initiators also work as a photo-sensitizer.

Sensitizers such as n-butylamine, triethylamine and tri-n-butylphosphine can be used in photo-reaction of epoxyacrylates.

The content of the photo-polymerization initiators or sensitizers in the UV ray curable resin layer is 0.1 to 25 parts by weight, and preferably 1 to 15 parts by weight, based on the 100 parts by weight of the UV ray curable resin layer.

The polymerizable monomers having one unsaturated double bond in the molecule include general monomers such as methyl acrylate, ethyl acrylate, butyl acrylate, benzyl acrylate, cyclohexyl acrylate, vinyl acetate and styrene. The polymerizable monomers having two or more unsaturated double bonds in the molecule include ethylene glycol diacrylate, propylene glycol diacrylate, divinylbenzene, 1,4-cyclohexane diacrylate, 1,4-cyclohexyldimethyl diacrylate, trimethylol propane triacrylate and pentaerythritol tetraacrylate.

The UV curable resins can be employed by selecting from those available on the market including ADEKAOPTOMER KR or BY Series such as KR-400, KR-410, KR-550, KR-566, KR-567 and BY-320B (manufactured by Asahi Denka Co., Ltd.); KOEIHARD A-101-KK, A-101-WS, C-302, C-401-N, C-501, M-101, M-102, T-102, D-102, NS-101, FT-102Q8, MAG-1-P20, AG-106 and M-101-C (manufactured by Koei Chemical Co., Ltd.); SEIKABEAM PHC2210(S), PHC X-9 (K-3), PHC2213, DP-10, DP-20, DP-30, P1000, P1100, P1200, P1300, P1400, P1500, P1600 and SCR900 (manufactured by Dainichiseika Color & Chemicals Mfg. Co., Ltd.); KRM7033, KRM7039, KRM7130, KRM7131, UVECRYL 29201 and UVECRYL 29202 (manufactured by Daicel U. C. B. Co., Ltd.); RC-5015, RC-5016, RC-5020, RC-5031, RC-5100, RC-5102, RC-5120, RC-5122, RC-5152, RC-5171, RC-5180 and RC-5181 (manufactured by Dainippon Ink & Chemicals, Inc.); OLEX No. 340 CLEAR (manufactured by Chugoku Marine Paints, Ltd.); SANRAD H-601, RC-750, RC-700, RC-600, RC-500, RC-611 and RC-612 (manufactured by Sanyo Chemical Industries, Ltd.); SP-1509 and SP-1507 (manufactured by Showa Highpolymer Co., Ltd.); RCC-15C (manufactured by Grace Japan Co., Ltd.) and ARONIX M-6100, M-8030 and M-8060 (manufactured by Toagosei Co., Ltd.), and NK HARD B-420, NK ESTER A-DOG and NK ESTER A-IBD-2E (manufactured by Shin-Nakamura Chemical Co., Ltd.).

Practical examples of the compounds include trimethylol propane triacrylate, di-trimethylol propane tetraacrylate, pentaerythritol triacrylate, pentaerythritol tetraacrylate, dipentaerythritol hexaacrylate, dioxane glycolacrylate, ethoxylated acrylate, alkyl-modified dipentaerythritol pentaacrylate and so on.

(Production Method of Hard Resin Layer)

The hard resin layer is formed by applying the coating composition for forming the hard coat layer employing conventional coating method such as a gravure coater, a dip coater, a reverse coater, a wire bar coater, a die coater and an inkjet method, after coating, drying by heat and preferably subjected to UV curing process.

Coating amount is suitably 0.1 to 40 μm, preferably, 0.5 to 30 μm in terms of wet thickness.

Dry thickness is 0.1 to 30 μm, preferably 1 to 20 μm in average. Insufficient hardness, deterioration of curl or brittleness production suitability are prevented within the range.

Light sources to cure layers of UV curable-resin by photocuring reaction are not specifically limited, and any light source may be used as far as UV ray is generated. For example, a low-pressure mercury lamp, a medium-pressure mercury lamp, a high-pressure mercury lamp, an ultrahigh-pressure mercury lamp, a carbon arc lamp, a metal halide lamp and a xenon lamp may be utilized.

The preferable irradiation quantity of light may vary depending on the type of lamps, however, it is preferably from 5 to 500 mJ/cm$^2$, and more preferably from 5 to 150 mJ/cm$^2$.

Irradiation of an actinic ray is preferably carried out under tension in the longitudinal direction of the film and more preferably under tension in both the lateral and the longitudinal directions. The preferable tension is from 30 to 300 N/m.

The method to apply tension to the film is not specifically limited and tension may be applied while the film is transported with back rolls or may be applied in a tenter in the lateral direction or in the biaxial directions of the film, whereby a cellulose ester film exhibiting a superior flatness can be obtained.

The organic solvents preferably contain propylene glycol monoalkylether (the alkyl having 1 to 4 carbon atoms) or propyleneglycol monoalkyletheracetate (the alkyl having 1 to 4 carbon atoms) in an amount of 5 percent by weight or more, and more preferably from 5 to 80 percent by weight.

(Polarizing Plate)

It is possible to prepare the polarizing plate employing a general method. It is preferable that an adhesive layer is provided on the reverse side of the acrylic resin containing film of the present invention and the resulting acrylic resin containing film is adhered to at least one of the sides of a polarizer which is produced by immersion into an iodine solution, and then stretched.

On the other side, employed may be the acrylic resin containing film of the present invention or another polarizing plate protective film.

For example, preferably employed are commercial cellulose ester films (such as KONICA MINOLTA TAC KC8UX, KC4UX, KC5UX, KC8UY, KC4UY, KC12UR, KC8UCR-3, KC8UCR-4, KC8UCR-5, KV8UY-HA, and KV8UX-RHA, all manufactured by Konica Minolta Opto, Inc.), cycloolefin films (such as ZEONOA FILM manufactured by ZEON CORPORATION, and ARTON FILM manufactured by JSR Co.).

A polarizer, which is a major constitutional component of the polarizing plate, is an element which transmits light in a polarized wave plane in a specific direction. The representative polarizing film, which is presently known, is a polyvinyl alcohol type polarizing film, which includes one dyed with iodine and the other which is dyed with dichroic dyes.

The employed polarizer is prepared as follows. A film is prepared employing an aqueous polyvinyl alcohol solution. The resulting film is uniaxially stretched, followed by dying, or after dying, it is uniaxially stretched, followed by an endurance enhancing treatment, by preferably employing boron compounds.

(Liquid Crystal Display Device)

By incorporating a polarizing plate, adhered together with the acrylic resin containing film of the present invention, in a liquid crystal display device, it is possible to produce a liquid crystal display device which excels in various kinds of visibility. The above polarizing plate is preferably employed specifically in large liquid crystal display devices, as well as outdoor liquid crystal display devices such as digital signage. The polarizing plate according to the present invention is adhered to liquid crystal cells via the above adhesive layer.

The polarizing plate according to the present invention is preferably employed in a reflection type, transparent type, or semi-transparent type LCD, or in various driving system LCDs such as a TN type, an STN type, an OCB type, an HAN type, a VA type (a PVA type and an MVA type), and an IPS type.

Specifically in a large screen display device, particularly a screen of at least 30 type, especially of 30 to 54 type, no white spots occur at the periphery of the screen and its effect is maintained over an extended duration.

EXAMPLE

The present invention is further described by reference to the following specific examples but the present invention is not limited thereto.

Example 1

Acrylic resins A-AC1 and AC2 and acrylic type polymer B-AC1 through AC3, described in Table 1 and Table 2 was manufactured in the known manner.

TABLE 1

| Acrylic Resin | MMA | MA | Molecular Weight |
|---|---|---|---|
| A-AC1 | 90 | 10 | 70,000 |
| A-AC2 | 90 | 10 | 280,000 |

TABLE 2

| Acrylic Resin | MMA | ACMO | HEMA | MA | Molecular Weight |
|---|---|---|---|---|---|
| B-AC1 | 70 | — | 10 | 20 | 5,000 |
| B-AC2 | 70 | 30 | — | — | 6,000 |
| B-AC3 | 90 | — | — | 10 | 8,000 |

(Abbreviation of Monomers in Table 1 and Table 2)
MMA: methyl methacrylate
MA: methyl acrylate
ACMO: N-Acryloyl morpholine
HEMA: 2-hydroxy methacrylate (Manufacture of Optical Film 101)

Melted composition of acrylic resin layer (B) was prepared by mixing, 70 parts by mass of acrylic resin A-AC1, 30 parts by mass of cellulose acetate propionate, having substitution degree of acetyl group of 0.1, substitution degree of propionyl group (Pr substitution degree) of 2.6, and substitution degree of total acyl group of 2.7, trade name of CAP-482-20, manufactured by Eastman Chemical Company), as a cellulose ester resin, and 0.2 parts by mass of phosphorous type anti-oxidant (Irgafos168: manufactured by Ciba Japan Ltd.).

Melted composition of cellulose ester resin layer (A) was prepared by mixing 85 parts by mass of cellulose acetate propionate (having substitution degree of acetyl group of 1.60, substitution degree of propionyl group of 1.20, substitution degree of total acyl group of 2.80, number average molecular weight of 60,000), 15 parts by mass of acrylic type polymer B-AC1, 1.5 parts by mass of TINUVIN 928 (manufactured by Ciba Japan Ltd.), 0.01 parts by mass of ADK STAB PEP-36 (manufactured by ADEKA Corp.), 0.5 parts by mass of IRGANOX1010 (manufactured by Ciba Japan Ltd.), 0.2 parts by mass of SUMILIZER GS (manufactured by Sumitomo Chemical Co., Ltd.), and 0.1 parts by mass of SEAHOSTARKEP-30 (manufactured by Nippon Shokubai Co., Ltd.).

Each of the above mentioned melted compositions was further dried via vacuum NAUTA Mixer while mixing at 70° C., 1 Torr, for 3 hours. Each of the dried mixtures was melted and blended, and palletized. All screw type screw was employed but not kneading disk so as to depressing heating due to shearing during blending in this instance. Volatile ingredient generated during blending was removed by vacuum aspiration through vent pores. Moisture absorption by resins was prevented by making desiccated nitrogen gas ambient atmosphere in the feeder and hopper supplying to the extruder and from extrusion die to cooling tank.

Melted composition of acrylic resin layer (B) and melted composition of cellulose ester resin layer (A) from each pellets were laminated on T die by employing a double spindle extruder and a single spindle extruder, respectively, and was extruded melted in film shape at melting temperature of 240° C. so that cellulose ester resin layer (A) was brought into contact with the first cooling roll having a surface temperature Ta (° C.) of 100° C., and then was conveyed so that the surface temperature of the second cooling roll Tb (° C.) became 95°

C., whereby cast film composed of two layers and having total film thickness of 220 μm was obtained by coextrusion forming, with an apparatus shown in FIG. 3. The employed T die had lip clearance of 1.5 mm, average surface roughness Ra at the lip portion of 0.01 μm. Film was pressed at liner pressure of 10 kg/cm by an elastic touch roll having metal surface of 2 mm thickness on the first cooling roll.

The first and the second cooling rollers were made of stainless steel with hard chromium plating surface thereof and having a diameter of 40 cm. Surface temperature of the roll was controlled by circulating oil for temperature control (cooling fluid) inside thereof. Elastic touch roll had a diameter of 20 cm, and inner and outer cylinders were made of stainless steel, and hard chromium plating was provided on the surface of the outer cylinder. Thickness of the outer cylinder was 2 mm, and the surface temperature of the elastic touch roll was controlled by circulating oil for temperature control (cooling fluid) in a space between the outer and inner cylinders.

Next, the film was stretched in a conveying direction of stretching factor 1.3 by a stretching device utilizing difference of roll circumference speed 160° C., then it was introduced into a tenter, which was a stretching device in width direction having a preheat zone, a stretching zone, a retention zone, and a cooling zone, wherein there was a neutral zone between each zone to ensure heat insulation between each zone, and was stretched 1.3 times in width direction at 160° C., then was cooled down to 70° C. The film was delivered from clips and side grip portions by clips were cut off to obtain Optical Film 101 having width of 2500 mm and a thickness of 80 μm.

Optical Films 102 to 107 were manufactured in the similar manner except that the surface temperature Ta (° C.) of the first cooling roll and the surface temperature Tb (° C.) of second cooling roll were varied as shown in Table 3.

As for the surface temperature of each of the elastic touch roll, the first cooling roll and the second cooling roll, the surface temperature was measured, employing non-contact thermometer, at 10 position in width direction at a position 90° prior to the position to which the film touches at first to each roll with respect to rotation direction, and the average thereof was set as the surface temperature.

<Evaluation>
(Light Leakage, Undulation)

To the obtained optical film under cross Nicol state, that is, interposed between two polarizing elements arranged in orthogonal state (cross Nicol state), light was irradiated from outside of one of the polarizing plate and was observed by eyes from outside of the another polarizing plate, light leakage and undulation were evaluated by the following criteria.
A: No light transmission, uniform dark field of view and no undulation was observed.
B: Partial brightness contrast in streak shape and slight undulation were observed.
C: Partial remarkable brightness contrast in streak shape and undulation were observed.

(Criteria of Film Flatness Evaluation)

Sample having 100 cm×40 cm was cut out at the time one our after starting melt extrusion film forming.

Black paper was placed on a flat desk and the sample film was place on it. Three fluorescent tubes obliquely placed above the film were mirrored on the film and flat ness was evaluated by degree of curvature of the fluorescent tube by the following criteria.
A: Three fluorescent tubes were all observed straight.
C: fluorescent tubes were observed remarkably curved.

(Close Adhesion Property Evaluation)

Condition of the film when a laminate film (100 mm×100 mm) was twisted off by hands was evaluated by the following criteria.

A: A laminate film was integrated and did not separate.
C: Peel off was observed in laminate film.

(Curl Evaluation)

Shape of each of optical laminate films after lamination was observed and lifting at the end portion of the film was measured when the optical laminate film was placed on a flat plane.

A: Lifting amount of not more than 1 mm.
C: Lifting amount of exceeding 1 mm.

The result of the above described evaluation is shown in Table 3.

TABLE 3

| Optical Film Sample No. | Ta (° C.) | Tb (° C.) | Light Leakage | Flatness | Close Adhesion | Curl | Remarks |
|---|---|---|---|---|---|---|---|
| 101 | 100 | 95 | A | A | A | A | Invention |
| 102 | 100 | 45 | A | A | A | A | Invention |
| 103 | 100 | 20 | A | A | A | A | Invention |
| 104 | 110 | 55 | A | A | A | A | Invention |
| 105 | 90 | 45 | A | A | A | A | Invention |
| 106 | 145 | 45 | C | C | C | C | Comparative |
| 107 | 30 | 30 | C | C | C | C | Comparative |

Table 3 demonstrates optical films 101 to 105 of the invention are excellent in light leakage, undulation, flatness, close adhesion property and curling property.

Further, there was not production trouble such as film break during production of the optical films of the invention, however, a few film breaks was observed during stretching in the comparative optical film.

Example 2

Optical films 201 to 214 were manufactured by modifying cellulose ester resin and acrylic resin in melted composition forming cellulose ester resin layer (A) and acrylic resin layer (B), the surface temperature Ta (° C.) of the first cooling roll, and the surface temperature Tb (° C.) of the second cooling roll, in optical film 101 in Example 1, described in Table 4.

(Measurement of Dynamic Viscoelasticity)

The value tan δa at the surface temperature Ta (° C.) of the above mentioned first cooling roll was obtained, wherein tan δ value obtained by measuring the dynamic viscoelasticity of a film formed by single layer melt extrusion of melted composition of the above described cellulose ester resin layer (A) in the range of 0° C. to 120° C. at measuring frequency 1 Hz was set as tan δa.

On the other side tan δb at the surface temperature Tb (° C.) of the above mentioned second cooling roll was obtained, wherein tan δ value obtained by measuring the dynamic viscoelasticity of a film formed by single layer melt extrusion of melted composition of the above described acrylic resin layer (B) in the range of 0° C. to 120° C. at measuring frequency 1 Hz was set as tan δb.

Value of tan δ was obtained by measuring dynamic viscoelasticity in the film extrusion direction at temperature raising rate of 5° C./min and temperature range of 0° C. to 120° C. Dynamic viscoelasticity was measured by employing a dynamic viscoelasticity measuring apparatus RSA III (manufactured by TA Instrument). Measuring frequency was 1 Hz.

The obtained optical films 201 to 214 were evaluated similarly to Example 1.

TABLE 4

| Optical Film No. | Ta (°C.) | Tb (°C.) | Acrylic resin layer (B) Acrylic resin parts by mass | Acrylic resin layer (B) Cellulose ester resin parts by mass | Cellulose ester resin (A) Cellulose ester resin parts by mass | Cellulose ester resin (A) Acrylic resin parts by mass | tanδa | tanδb | Light Leakage | Flatness | Close adhesion property | Curling property | Remarks |
|---|---|---|---|---|---|---|---|---|---|---|---|---|---|
| 201 | 100 | 95 | 55 | 45 | 80 | 20 | 0.1 | 0.2 | A | A | A | A | Invention |
| 202 | 100 | 45 | 75 | 25 | 80 | 20 | 0.1 | 0.1 | A | A | A | A | Invention |
| 203 | 100 | 20 | 99 | 1 | 80 | 20 | 0.1 | 0.05 | A | A | A | A | Invention |
| 204 | 110 | 55 | 65 | 35 | 99 | 1 | 0.5 | 0.1 | A | A | A | A | Invention |
| 205 | 90 | 45 | 75 | 25 | 55 | 45 | 0.35 | 0.1 | A | A | A | A | Invention |
| 206 | 145 | 30 | 65 | 35 | 80 | 20 | 0.6 | 0.03 | C | C | C | C | Comparative |
| 207 | 30 | 100 | 65 | 35 | 80 | 20 | 0.05 | 0.3 | C | C | C | C | Comparative |
| 208 | 30 | 30 | 100 | — | 100 | — | 0.05 | 0.03 | C | C | C | C | Comparative |
| 209 | 100 | 95 | 55 | 45 | 50 | 50 | 0.1 | 0.2 | C | B | C | B | Comparative |
| 210 | 100 | 95 | 55 | 45 | 100 | — | 0.1 | 0.2 | B | C | C | B | Comparative |
| 211 | 100 | 95 | 50 | 50 | 80 | 20 | 0.1 | 0.2 | C | C | B | C | Comparative |
| 212 | 100 | 95 | 100 | — | 80 | 20 | 0.1 | 0.2 | B | C | C | B | Comparative |
| 213 | 100 | 15 | 55 | 45 | 80 | 20 | 0.1 | 0.02 | B | C | C | B | Comparative |
| 214 | 100 | 98 | 55 | 45 | 80 | 20 | 0.1 | 0.25 | B | C | C | B | Comparative |

Table 4 demonstrates that the optical films 201 to 205 of the invention are excellent in light leakage, undulation, flatness, close adhesion property and curling properly.

Example 3

Optical film 301 to 312 were prepared in employing each resins of cellulose ester resin, acrylic resin, and CAB, PMMA, polystyrene, polyester, poly cycloolefin and polycarbonate, as shown in Table 5, the production condition of Optical film 105 of the invention in Example 1.
(Abbreviation of Materials in Table 5)
CAP: cellulose acetate propionate
CAB: cellulose acetate butylate (acetyl group substitution degree of 1.0, and butylyl group substitution degree of 1.7)
PMMA: polymethyl methacrylate (DIANAL BR 83 manufactured by Mitsubishi Rayon Co., Ltd.)

Polystyrene: DAYLARK D332 (manufactured by NOVA Chemicals Corp.) Polyester: ECDEL9966 (manufactured by Eastman Chemical Company) Polycycloolefin: ZEONOR1420R (manufactured by ZEON Corp.)

Polycarbonate: polycarbonate resin PANLITE (manufactured by Teijin Chemicals Ltd.)

Evaluation of Example 1 was conducted for the obtained optical films, and the result is shown in Table 6.

TABLE 5

| Optical Film Sample No. | Acrylic resin layer (B) Acrylic resin Species | Acrylic resin layer (B) Acrylic resin Parts by mass | Acrylic resin layer (B) Cellulose ester resin Species | Acrylic resin layer (B) Cellulose ester resin Total Substitution degree | Acrylic resin layer (B) Cellulose ester resin Pr Substitution degree | Acrylic resin layer (B) Cellulose ester resin Parts by mass | Acrylic resin layer (B) Thickness μm | Cellulose ester resin layer (A) Cellulose ester resin Species | Cellulose ester resin layer (A) Cellulose ester resin Total Substitution degree | Cellulose ester resin layer (A) Cellulose ester resin Pr Substitution degree | Cellulose ester resin layer (A) Cellulose ester resin Parts by mass | Cellulose ester resin layer (A) acrylic resin Species | Cellulose ester resin layer (A) acrylic resin Parts by mass | Cellulose ester resin layer (A) Thickness μm | Remarks |
|---|---|---|---|---|---|---|---|---|---|---|---|---|---|---|---|
| 301 | A-AC1 | 70 | CAP | 2.7 | 2.6 | 30 | 16 | CAP | 2.8 | 1.2 | 85 | B-AC1 | 15 | 64 | Inv. |
| 302 | A-AC1 | 60 | CAP | 2.7 | 2.6 | 40 | 16 | CAP | 2.8 | 1.2 | 70 | B-AC1 | 30 | 64 | Inv. |
| 303 | A-AC1 | 90 | CAP | 2.7 | 2.6 | 10 | 16 | CAP | 2.8 | 1.2 | 95 | B-AC1 | 5 | 64 | Inv. |
| 304 | A-AC1 | 70 | CAP | 2.7 | 2.6 | 30 | 16 | CAP | 2.7 | 2.6 | 70 | B-AC3 | 30 | 64 | Inv. |
| 305 | A-AC2 | 70 | CAP | 2.7 | 2.6 | 30 | 16 | CAP | 2.8 | 1.2 | 85 | B-AC2 | 15 | 64 | Inv. |
| 306 | A-AC1 | 55 | CAP | 2.7 | 2.6 | 45 | 16 | CAP | 2.8 | 1.2 | 55 | B-AC1 | 45 | 64 | Inv. |
| 307 | A-AC1 | 100 | — | — | — | — | 16 | CAP | 2.8 | 1.2 | 100 | — | — | 64 | Comp. |
| 308 | A-AC1 | 70 | CAP | 2.7 | 2.6 | 30 | 64 | CAP | 2.8 | 1.2 | 85 | B-AC1 | 15 | 16 | Inv. |
| 309 | A-AC1 | 70 | CAP | 2.7 | 2.6 | 30 | 40 | CAP | 2.8 | 1.2 | 85 | B-AC1 | 15 | 40 | Inv. |
| 310 | PMMA | 100 | — | — | — | — | 33.6 | CAB | 2.7 | — | 100 | — | — | 46.4 | Comp. |
| 311 | Polystyrene | 100 | — | — | — | — | 40 | Polycycloolefin | — | — | 100 | — | — | 40 | Comp. |
| 312 | Polyester | 100 | — | — | — | — | 12 | Polycarbonate | — | — | 100 | — | — | 68 | Comp. |

Inv.: Invention Comp.: Comparative

TABLE 6

| Optical Film Sample No. | Light Leakage | Flatness | Close Contact | Curl | Remarks |
|---|---|---|---|---|---|
| 301 | A | A | A | A | Invention |
| 302 | A | A | A | A | Invention |
| 303 | A | A | A | A | Invention |
| 304 | B | A | A | A | Invention |
| 305 | A | A | A | A | Invention |
| 306 | A | A | A | A | Invention |
| 307 | C | C | C | C | Comparative |
| 308 | A | A | A | A | Invention |
| 309 | A | A | A | A | Invention |
| 310 | C | C | C | C | Comparative |
| 311 | C | C | C | C | Comparative |
| 312 | C | C | C | C | Comparative |

Table 6 demonstrates that optical films 301 to 306, 308, 309 of the invention are excellent in light leakage, undulation, flatness, close adhesion property and curling property.

Example 4

A hard coat layer shown below was applied on each of optical films 101 to 107 manufactured by Example 1, and polarizing plate was manufactured. The polarizing plate was attached to a liquid crystal display, and light leakage was evaluated.

<Hard Coat Layer>

Hard coat layer composition described below was applied on each of optical films 101 to 107 of the invention at a side of the acrylic resin layer (B) to have a dry film thickness of 3.5 μm, and dried for one minute at 80° C.

A hard coat film having a hard coat layer was manufactured by curing with high pressure mercury lamp (80 W) at a condition of 150 mJ/cm². Index of refraction of the hard coat layer was 1.50.

| <Hard Coat Layer Composition> | |
|---|---|
| Dipentaerythritol hexaacrylate (containing around 20% of dimer and multimer) | 108 parts by mass |
| IRGACURE 184 (manufactured by Ciba Japan Ltd.) | 2 parts by mass |
| Propyleneglycol monomethylether | 180 parts by mass |
| Ethyl acetate | 120 parts by mass |

(Manufacture of Polarizing Plate)

Optical films 101 to 107 having a hard coat layer manufactured as described above were subjected to alkali saponification treatment as described below, and polarizing plates were prepared.

| <Alkali Saponification Treatment> | | | |
|---|---|---|---|
| Saponification process: | 2M/l-NaOH | 50° C. | 90 sec. |
| Water washing process: | water | 30° C. | 45 sec. |
| Neutralization process: | 10% by mass of HCl | 30° C. | 45 sec. |
| Water washing process: | Water | 30° C. | 45 sec. |

After saponification treatment, water washing, neutralization, water washing were conducted in the order, then dried at 80° C.

<Manufacture of Polarizing Element>

Long rolled polyvinyl alcohol film having a thickness of 120 μm was immersed in 10 parts by mass of an aqueous solution containing 1 parts by mass of iodine, 4 parts by mass of boric acid, and stretched with stretch factor of 5 times at 50° C. in conveying direction, and a polarizing element was prepared.

The above described optical film subjected to alkali saponification treatment was pasted at a cellulose ester resin layer (A) side to one side of above described polarizing element, and KONICA MINOLTA TAC KC4FR-1 (manufactured by Konica Minolta Opto, Inc.) was pasted to the other side, employing 5% aqueous solution of complete saponification polyvinyl alcohol as an adhesive, respectively, and dried to manufacture Polarizing Plates 101 to 107 employing Optical Films 101 to 107.

<Manufacture of Liquid Crystal Display>

Polarizing plate at view side already pasted in VA type liquid crystal display (15 type display VL-150SD manufactured by Fujitsu Ltd.) was peeled off, and Polarizing Plates 101 to 107 manufactured above were pasted to glass surface of the VA type liquid crystal cell, whereby corresponding Liquid Crystal Displays 101 to 107 were manufactured. In this instance, an acrylic resin layer (B) of the optical film manufactured as described above was set at displaying side, and, the polarizing plate was pasted in a direction so as to have the absorption axis in the same direction as the originally used polarizing plate.

Light leakage was evaluated by eye observing whole black display state in a dark room after lighting back light continuously for 12 hours at 23° C., 55% RH.

(Light Leakage)

Light leakage was evaluated by eye observation of black display by the following criteria.

A: No light leakage was observed
B: 1 to 2 weak light leakages were observed
C: 1 to 2 strong light leakages were observed As the result, light leakage evaluation of the polarizing plates and the liquid crystal displays employing Optical Films 101 to 105 of the invention was ranked A, and had high contrast. Polarizing plates and liquid crystal displays employing Optical films 106 and 107 were ranked C in light leakage evaluation, and had low contrast.

| DESCRIPTION OF SYMBOLS | |
|---|---|
| 1: | extruder |
| 2: | filter |
| 4: | die |
| 5: | support roll (first cooling roll) |
| 6: | brought into contact with pressure roll (elastic touch roll) |
| 7: | support roll (second cooling roll) |
| 8: | support roll (third cooling roll) |
| 9: | take off roll |
| 10: | cellulose ester film |
| 11, 13, 14, 15: | conveyer roll |
| 12: | stretching device |
| 16: | winding device |
| 51: | lip adjust bolts |
| 52: | extrude portion A |
| 53: | extrude portion B |
| 54: | extrude portion C |
| 55: | manifold A |
| 56: | manifold B |
| 57: | manifold C |
| 58: | feed block |
| 59: | choke bar |
| 60: | adjuster bolt |

The invention claimed is:

1. A method for producing an optical film by laminating a cellulose ester resin layer (A) and an acrylic resin layer (B) comprising:

coextruding a melt composition of a cellulose ester resin and a melt composition of an acrylic resin, wherein the cellulose ester resin layer (A) contains 55 to 99% by mass of a cellulose ester resin, and 1 to 45% by mass of an acrylic resin, wherein total content of the cellulose ester resin and the acrylic resin is 100% by mass, the acrylic resin layer (B) contains 55 to 99% by mass of an acrylic resin, and 1 to 45% by mass of a cellulose ester resin, wherein total content of the cellulose ester resin and the acrylic resin is 100% by mass; and conveying coextruded web while cooling by a first cooling roll and a second cooling roll arranged subsequent to the first cooling roll, wherein the coextruded web is conveyed while the cellulose ester resin layer (A) being in contact with a surface of the first cooling roll, and the acrylic resin layer (B) being in contact with a surface of the second cooling roll, and Ta (° C.) and Tb (° C.) satisfy the following relation 1, wherein Ta (° C.) is a surface temperature of the first cooling roll, and Tb (° C.) is a surface temperature of the second cooling roll, $(Ta-80)° C. < Tb(° C.) < (Ta-5)° C.$,  Relation 1 wherein a weight average molecular weight of the cellulose ester resin of the acrylic resin layer (B) is 100,000 to 400,000.

2. The method for producing an optical film described in claim 1, wherein the cellulose ester resin of the acrylic resin layer (B) satisfies formulas (1), (2) and (3), $2.40 \leq X+Y \leq 3.00$  (1)

$0 \leq X \leq 2.40$  (2)

$0.10 \leq Y \leq 3.00$  (3)

in the formulas, X represents an average substitution degree by acetyl group at 2, 3 and 6 positions, Y represents sum of an average substitution degree by acyl group having 3 to 5 carbon atoms at 2, 3 and 6 positions.

3. An optical film produced by a method for producing an optical film described in claim 1.

4. A polarizing plate employing the optical film described in claim 3.

5. A liquid crystal display employing the polarizing plate described in claim 4.

6. The method for producing an optical film described in claim 1, wherein tan δa at a surface temperature of the first cooling roll Ta (° C.) satisfies $0.1 \leq \tan δa \leq 0.5$, wherein tan δa is a value of tan θ obtained by measuring dynamic viscoelasticity of a film formed by melt extrusion of meld composition of a resin in the cellulose ester resin layer (A) in a single layer, measured in a range from 0° C. to 120° C. at measuring frequency of 1 Hz, and tan δb at a surface temperature of the second cooling roll Tb (° C.) satisfies $0.05 \leq \tan δb \leq 0.2$, wherein tan δb is a value of tan θ obtained by measuring dynamic viscoelasticity of a film formed by melt extrusion of melt composition of a resin in the acrylic resin layer (B) in a single layer, measured in a range from 0° C. to 120° C. at a measuring frequency of 1 Hz.

7. The method for producing an optical film of claim 1, wherein the weight average molecular weight of the cellulose ester resin of the acrylic resin layer (B) is 150,000 to 300,000.

* * * * *